United States Patent
Sarwer et al.

(10) Patent No.: US 12,058,322 B2
(45) Date of Patent: Aug. 6, 2024

(54) METHODS AND APPARATUSES FOR FILTERING INTRA PREDICTED VIDEO BLOCKS

(71) Applicant: ALIBABA GROUP HOLDING LIMITED, Grand Cayman (KY)

(72) Inventors: Mohammed Golam Sarwer, San Mateo, CA (US); Yan Ye, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/452,482

(22) Filed: Oct. 27, 2021

(65) Prior Publication Data

US 2022/0141459 A1    May 5, 2022

Related U.S. Application Data

(60) Provisional application No. 63/110,320, filed on Nov. 5, 2020.

(51) Int. Cl.
| | | |
|---|---|---|
| *H04N 19/117* | (2014.01) | |
| *H04N 19/105* | (2014.01) | |
| *H04N 19/132* | (2014.01) | |
| *H04N 19/159* | (2014.01) | |
| *H04N 19/176* | (2014.01) | |
| *H04N 19/46* | (2014.01) | |
| *H04N 19/82* | (2014.01) | |

(52) U.S. Cl.
CPC ......... *H04N 19/117* (2014.11); *H04N 19/105* (2014.11); *H04N 19/132* (2014.11); *H04N 19/159* (2014.11); *H04N 19/176* (2014.11); *H04N 19/46* (2014.11); *H04N 19/82* (2014.11)

(58) Field of Classification Search
None
See application file for complete search history.

(56) References Cited

U.S. PATENT DOCUMENTS

| | | | |
|---|---|---|---|
| 2015/0195566 A1* | 7/2015 | Hinz | H04N 19/119 375/240.12 |
| 2019/0052875 A1* | 2/2019 | Son | H04N 19/85 |
| 2019/0200012 A1* | 6/2019 | Lee | H04N 19/82 |
| 2020/0053385 A1* | 2/2020 | Lee | H04N 19/124 |

(Continued)

FOREIGN PATENT DOCUMENTS

| | | |
|---|---|---|
| WO | WO 2016/205718 A1 | 12/2016 |
| WO | WO 2022/095783 A1 | 5/2022 |

OTHER PUBLICATIONS

AV1 codec, https://en.wikipedia.org/wiki/AV1, 30 pages.
(Continued)

*Primary Examiner* — Chikaodili E Anyikire
(74) *Attorney, Agent, or Firm* — Finnegan, Henderson, Farabow, Garrett & Dunner, LLP

(57) ABSTRACT

The present disclosure provides methods and apparatuses for applying intra prediction refinement to intra predicted samples. An exemplary method includes: determining a filter based on neighboring samples of intra predicted samples of a picture; generating an offset value based on the neighboring samples; refining the intra predicted samples by adding the offset value; and applying the filter to the intra predicted samples.

17 Claims, 26 Drawing Sheets

(56) References Cited

U.S. PATENT DOCUMENTS

2020/0236354 A1    6/2020  Bordes et al.
2021/0084313 A1*  3/2021  Nguyen .................. G06T 5/002

OTHER PUBLICATIONS

Chen et al., "An Overview of Core Coding Tools in the AV1 Video Codec," 2018 Picture Coding Symposium (PCS), San Francisco, CA, 2018, pp. 41-45.
Rivaz, et al., "AV1 Bitstream & Decoding Process Specification," https://aomediacodec.github.io/av1-spec/av1-spec.pdf, 681 pages.
PCT International Search Report and Written Opinion mailed Jan. 17, 2022, issued in corresponding International Application No. PCT/CN2021/127058 (7 pgs.).

* cited by examiner

FIG. 8

| k | $W_{k0}$ | $W_{k1}$ | $W_{k2}$ | $W_{k3}$ | $W_{k4}$ | $W_{k5}$ | $W_{k6}$ | $W_{k7}$ | $W_{k8}$ |
|---|---|---|---|---|---|---|---|---|---|
| 0 | 4 | 16 | 4 | 0 | 0 | 16 | 4 | 0 | 0 |
| 1 | 2 | 4 | 16 | 4 | 0 | 8 | 2 | 0 | 0 |
| 2 | 1 | 0 | 4 | 16 | 4 | 4 | 1 | 0 | 0 |
| 3 | 0 | 0 | 2 | 4 | 16 | 2 | 0 | 0 | 0 |
| 4 | 2 | 8 | 2 | 0 | 0 | 4 | 16 | 4 | 0 |
| 5 | 0 | 2 | 8 | 2 | 0 | 2 | 8 | 2 | 0 |
| 6 | 0 | 0 | 2 | 8 | 2 | 1 | 4 | 1 | 0 |
| 7 | 0 | 0 | 0 | 2 | 8 | 1 | 2 | 0 | 0 |
| 8 | 0 | 4 | 0 | 0 | 0 | 0 | 4 | 16 | 4 |
| 9 | 0 | 0 | 4 | 0 | 0 | 0 | 2 | 8 | 2 |
| 10 | 0 | 0 | 1 | 4 | 1 | 0 | 1 | 4 | 1 |
| 11 | 0 | 0 | 0 | 2 | 4 | 0 | 0 | 4 | 0 |
| 12 | 0 | 0 | 1 | 0 | 0 | 0 | 2 | 4 | 16 |
| 13 | 0 | 0 | 0 | 1 | 0 | 0 | 1 | 2 | 8 |
| 14 | 0 | 0 | 1 | 2 | 1 | 0 | 0 | 1 | 4 |
| 15 | 0 | 0 | 0 | 1 | 2 | 0 | 0 | 1 | 2 |

FIG. 9

| Intra-prediction modes | Proposed Sub-block level filtering |
|---|---|
| DC, SMOOTH_V, SMOOTH_H, SMOOTH | Enabled |
| HOR and VER mode | Enabled |
| Directional modes except HOR and VER | Disabled |
| Filter intra mode | Enabled |
| PAETH intra mode | Disabled |

FIG. 11

| | Type |
|---|---|
| intra frame mode info( ) { | |
|   skip = 0 | |
|   if ( SegIdPreSkip ) | |
|     intra segment id( ) | |
|   skip mode = 0 | |
|   read skip( ) | |
|   if ( !SeqIdPreSkip ) | |
|     intra segment id( ) | |
|   read cdef( ) | |
|   read delta qindex( ) | |
|   read delta lf( ) | |
|   ReadDeltas = 0 | |
|   RefFrame[ 0 ] = INTRA FRAME | |
|   RefFrame[ 1 ] = NONE | |
|   if ( allow intrabc ) { | |
|     use intrabc | S( ) |
|   } else { | |
|     use intrabc = 0 | |
|   } | |
|   if ( use intrabc ) { | |
|     is inter = 1 | |
|     YMode = DC PRED | |
|     UVMode = DC PRED | |
|     motion mode = SIMPLE | |
|     compound mode = COMPOUND AVERAGE | |
|     PaletteSizeY = 0 | |
|     PaletteSizeUV = 0 | |
|     interp filter[ 0 ] = BILINEAR | |
|     interp filter[ 1 ] = BILINEAR | |
|     find mv stack( 0 ) | |
|     assign mv( 0 ) | |
|   } else { | |
|     is inter = 0 | |
|     intra frame y mode | S( ) |
|     YMode = intra frame y mode | |
|     intra angle info y( ) | |
|     if ( HasChroma ) { | |
|       uv mode | S( ) |
|       UVMode = uv mode | |
|       if ( UVMode == UV CFL PRED ) { | |
|         read cfl alphas( ) | |
|       } | |
|       intra angle info uv( ) | |
|     } | |
|     PaletteSizeY = 0 | |
|     PaletteSizeUV = 0 | |
|     if ( MiSize >= BLOCK 8X8 && | |
|       Block Width[ MiSize ] <= 64 && | |
|       Block Height[ MiSize ] <= 64 && | |

FIG. 13

| | |
|---|---|
| allow screen content tools ) { | |
| palette mode info ( ) | |
| } | |
| filter intra mode info( ) | |
| if(PaletteSizeY == 0) | |
| use intra pred filter | S( ) |
| } | |
| } | |

FIG. 13
(continued)

| intra block mode info( ) {                          | Type |
|-----------------------------------------------------|------|
| RefFrame[ 0 ] = INTRA FRAME                         |      |
| RefFrame[ 1 ] = NONE                                |      |
| y mode                                          | S( ) |
| YMode = y mode                                      |      |
| intra angle info y( )                               |      |
| if ( HasChroma ) {                                  |      |
|   uv mode                             | S( ) |
|   UVMode = uv mode                        |      |
|   if ( UVMode == UV CFL PRED ) {          |      |
|     read cfl alphas( )          |      |
|   }                                       |      |
|   intra angle info uv( )                  |      |
| }                                                   |      |
| PaletteSizeY = 0                                    |      |
| PaletteSizeUV = 0                                   |      |
| if ( MiSize >= BLOCK 8X8 &&                         |      |
|   Block Width[ MiSize ] <= 64 &&          |      |
|   Block Height[ MiSize ] <= 64 &&         |      |
|   allow screen content tools )            |      |
|   palette mode info( )                    |      |
| filter intra mode info( )                           |      |
|   if(PaletteSizeY == 0)               |      |
|     use intra pred filter   | S( ) |
| }                                                   |      |

FIG. 14

| Prediction modes | Signal use_intra_pred_filter? | Inference value of use_intra_pred_filter |
|---|---|---|
| DC, SMOOTH, SMOOTH_V, SMOOTH_H | No | 1 |
| HOR, VER | Yes | |
| Nominal Directional modes except HOR and VER | No | 0 |
| Filter intra | No | 1 |
| Other modes | No | 0 |

FIG. 15

| AV1 filter intra modes | Inference value of use_intra_pred_filter |
|---|---|
| FILTER_DC_PRED | 0 |
| FILTER_V_PRED | 1 |
| FILTER_H_PRED | 1 |
| FILTER_D157_PRED | 0 |
| FILTER_PAETH_PRED | 0 |

FIG. 16

| Prediction modes | Signal use_intra_pred_filter? | Inference value of use_intra_pred_filter |
|---|---|---|
| DC | No | Luma: 1, Chroma: 0 |
| SMOOTH, SMOOTH_V, SMOOTH_H | No | Luma: 1, Chroma: 1 |
| HOR, VER | Yes | |
| Nominal Directional modes except HOR and VER | No | Luma: 0, Chroma: 0 |
| Filter intra | No | Luma: 1, Chroma: 1 |
| Other modes | No | Luma: 0, Chroma: 0 |

FIG. 17

| Intra-prediction modes | Smoothing filter |
|---|---|
| DC, SMOOTH_V, SMOOTH_H, SMOOTH | Disabled |
| Nominal directional modes | Enabled |
| Directional modes except nominal modes | Disabled |
| Filter intra mode | Disabled |
| PAETH intra mode | Disabled |

FIG. 19

METHODS AND APPARATUSES FOR FILTERING INTRA PREDICTED VIDEO BLOCKS

CROSS-REFERENCE TO RELATED APPLICATIONS

The disclosure claims the benefits of priority to U.S. Provisional Application No. 63/110,320 filed on Nov. 5, 2020, which is incorporated herein by reference in their entireties.

TECHNICAL FIELD

The present disclosure generally relates to video processing, and more particularly, to intra prediction filters of video coding and decoding.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AV1 standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure are directed to intra prediction refinement of video coding. In some embodiments, an exemplary method for decoding video includes: determining a filter based on neighboring samples of intra predicted samples of a picture; generating an offset value based on the neighboring predicted samples; refining the intra-predicted samples by adding the offset value; and applying the filter to the intra predicted samples.

Embodiments of the present disclosure provide a system for decoding video. The system comprises: a memory storing a set of instructions; and one or more processors are configured to execute the set of instructions to cause the system to perform a process for decoding video, wherein performing the process comprises: determining a filter based on neighboring samples of intra predicted samples of a picture; generating an offset value based on the neighboring predicted samples; refining the intra-predicted samples by adding the offset value; and applying the filter to the intra predicted samples.

Embodiments of the present disclosure further provide a non-transitory computer readable medium that stores a set of instructions that is executable by one or more processors of an apparatus to cause the apparatus to initiate a method for decoding video. The method comprises: determining a filter based on neighboring samples of intra predicted samples of a picture; generating an offset value based on the neighboring predicted samples; refining the intra-predicted samples by adding the offset value; and applying the filter to the intra predicted samples.

BRIEF DESCRIPTION OF THE DRAWINGS

Embodiments and various aspects of the present disclosure are illustrated in the following detailed description and the accompanying figures. Various features shown in the figures are not drawn to scale.

FIG. 8 is a schematic diagram illustrating an exemplary sub-block level refinement process, consistent with some embodiments of the present disclosure.

FIG. 9 is a table showing exemplary filter weights with shift=6, consistent with some embodiments of the present disclosure.

FIG. 11 is a table showing mode dependent enabling of sub-block level refinement, consistent with some embodiments of the present disclosure.

FIG. 13 is a table showing an exemplary intra_frame_mode_info( ) syntax, consistent with some embodiments of the present disclosure.

FIG. 14 is a table showing an exemplary intra_block_mode_info( ) syntax, consistent with some embodiments of the present disclosure.

FIG. 15 is a table showing examples of mode dependent signaling and inference values of use_intra_pred_filter flag, consistent with some embodiments of the present disclosure.

FIG. 16 is a table showing inference values of use_intra_pred_filter based on the filter intra mode type, consistent with some embodiments of the present disclosure.

FIG. 17 is a table showing inference values of use_intra_pred_filter based on color component and prediction mode, consistent with some embodiments of the present disclosure.

FIG. 19 is a table showing a mode dependent smoothing filter, consistent with some embodiments of the present disclosure.

DETAILED DESCRIPTION

Figure 1:
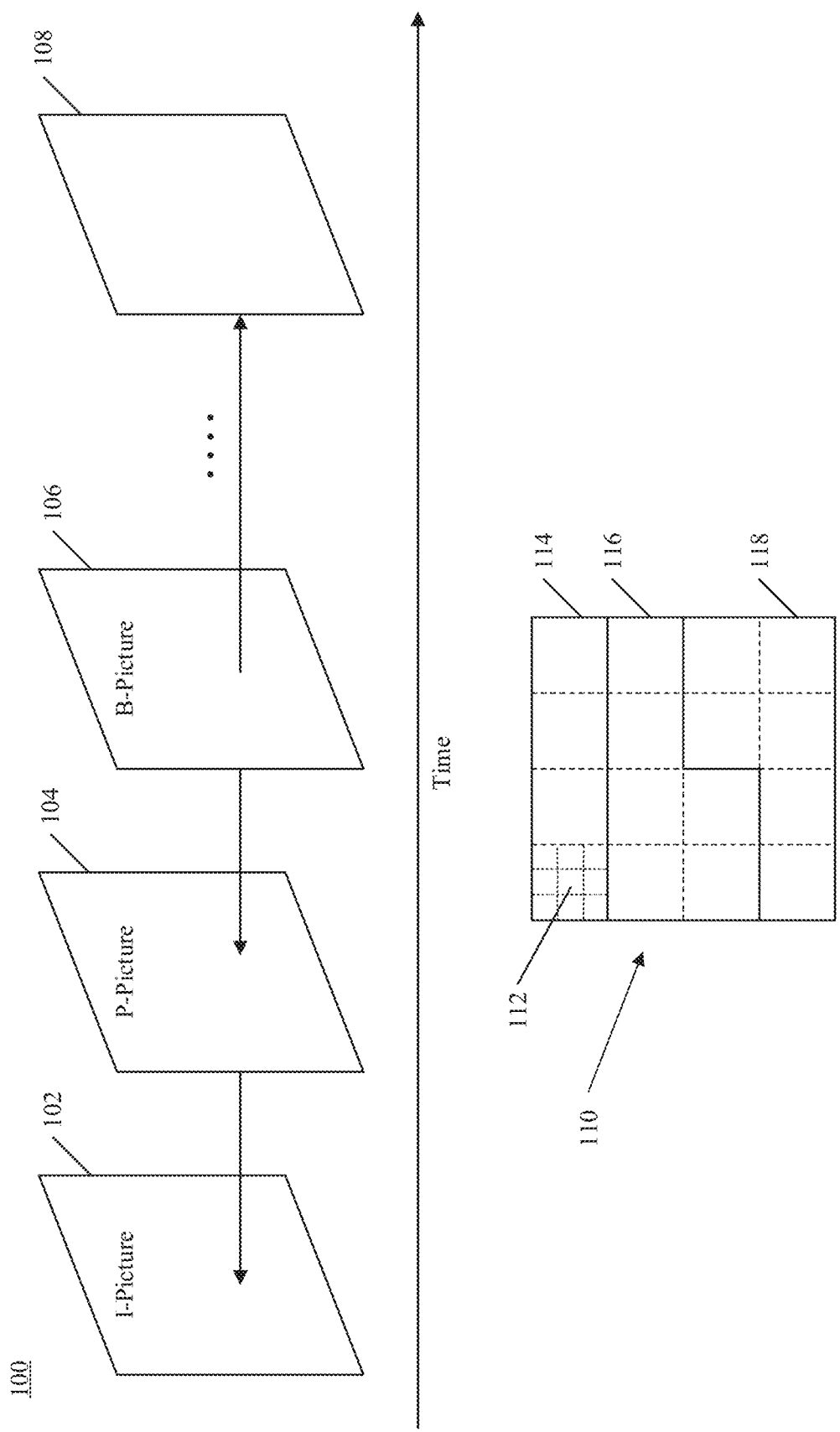
FIG. 1 shows structures of an example video sequence, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Alliance for Open Media (AOMedia) is an industry consortium founded in 2015. AV1 is the first video coding standard developed by AOMedia. The first version of AV1 was released in 2018. In 2019, AOMedia started to work on developing its next generation codec AV2. The goal of the AOMedia next generation codec AV2 is to achieve significant compression gain as compared to conventional codecs.

AV1 standard is based on the same hybrid video coding system that has been used in modern video compression standards such as HEVC, H.264/AVC, MPEG-2, H.263, etc.

A video is a set of static pictures (or frames) arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

To reduce the storage space and the transmission bandwidth needed by such applications, the video can be compressed. For example, the video can be compressed before storage and transmission and decompressed before the display. The compression and decompression can be implemented by software executed by a processor (e.g., a processor of a generic computer) or specialized hardware. The module or circuitry for compression is generally referred to as an "encoder," and the module or circuitry for decompression is generally referred to as a "decoder." The encoder and the decoder can be collectively referred to as a "codec." The encoder and the decoder can be implemented as any of a variety of suitable hardware, software, or a combination thereof. For example, the hardware implementation of the encoder and the decoder can include circuitry, such as one or more microprocessors, digital signal processors ("DSPs"), application-specific integrated circuits ("ASICs"), field-programmable gate arrays ("FPGAs"), discrete logic, or any combinations thereof. The software implementation of the encoder and the decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture. If information that was disregarded in the video encoding process cannot be fully reconstructed, the encoding process can be referred to as "lossy." Otherwise, it can be referred to as "lossless." Most encoding processes are lossy, which is a tradeoff to reduce the needed storage space and the transmission bandwidth.

In many cases, the useful information of a picture being encoded (referred to as a "current picture") can include changes with respect to a reference picture (e.g., a picture previously encoded or reconstructed). Such changes can include position changes, luminosity changes, or color changes of the pixels. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 shows structures of an example video sequence, according to some embodiments of the present disclosure. As shown in FIG. 1, video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
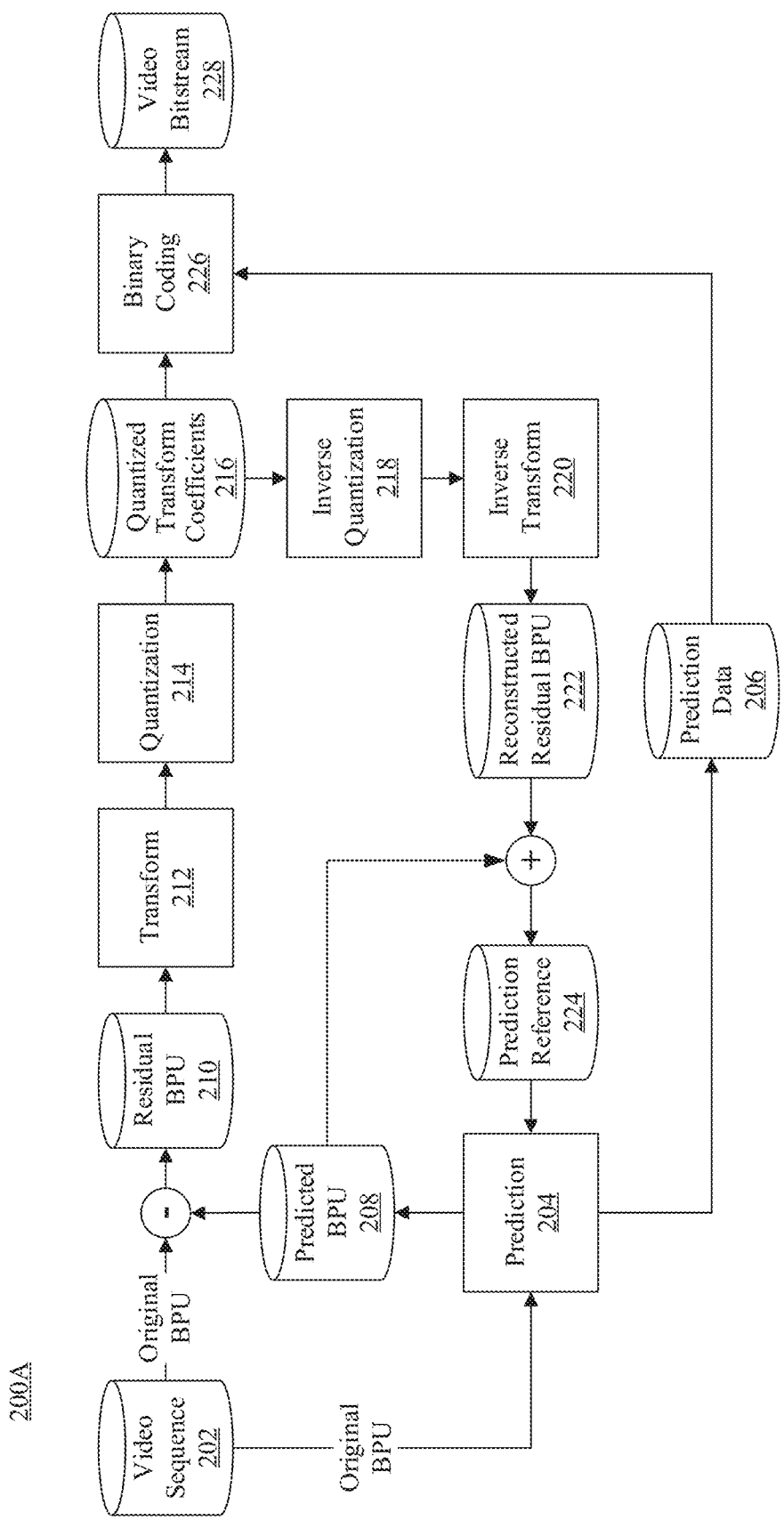
FIG. 2A shows a schematic of an example encoding process, consistent with some embodiments of the present disclosure.
Figure 2B:
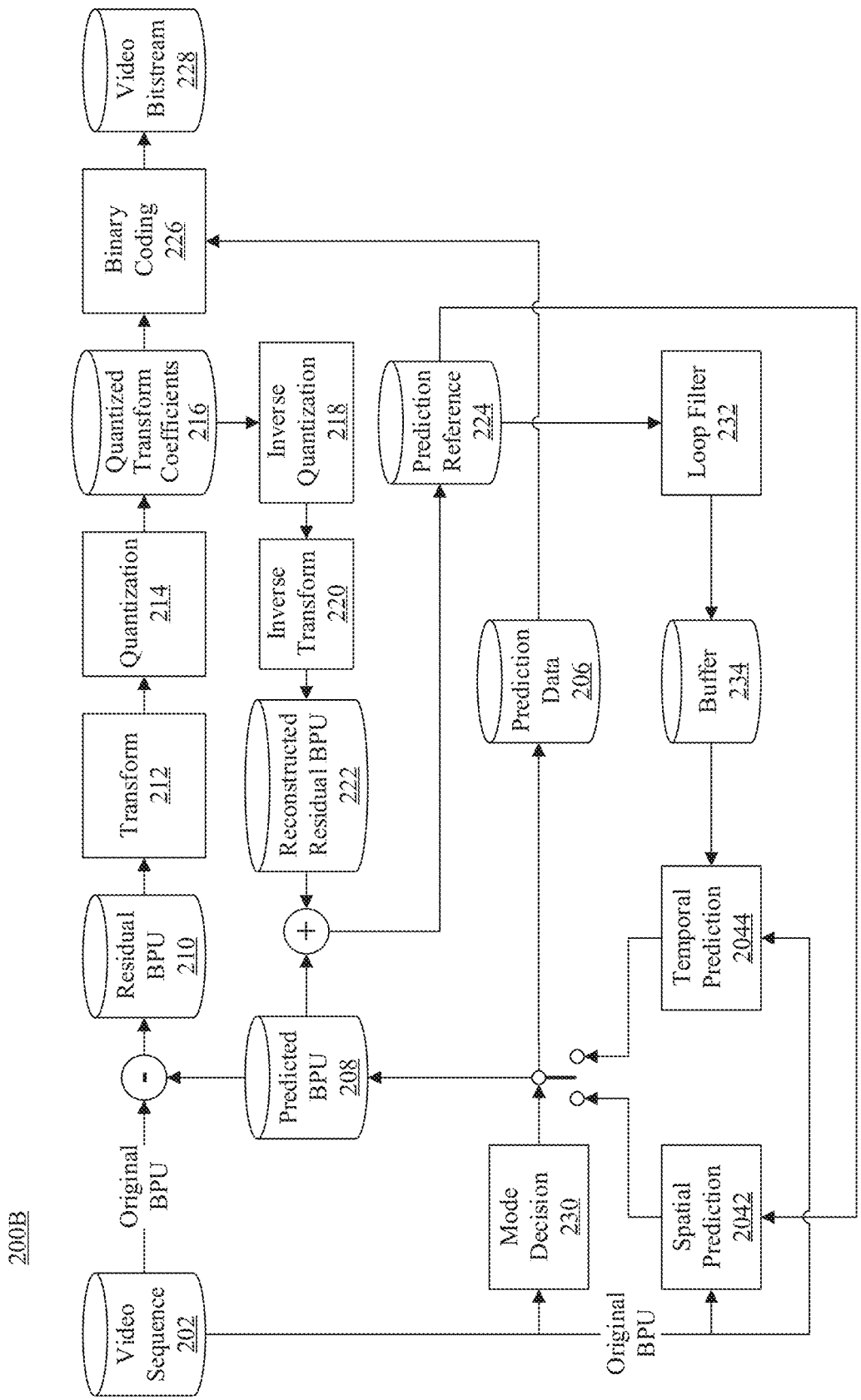
FIG. 2B shows a schematic of another example encoding process, consistent with some embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A shows a schematic of an example encoding process, according to some embodiments of the present disclosure. For example, encoding process 200A shown in FIG. 2A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B shows a schematic of another example encoding process, according to some embodiments of the present disclosure. As shown in FIG. 2B, process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction stage 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
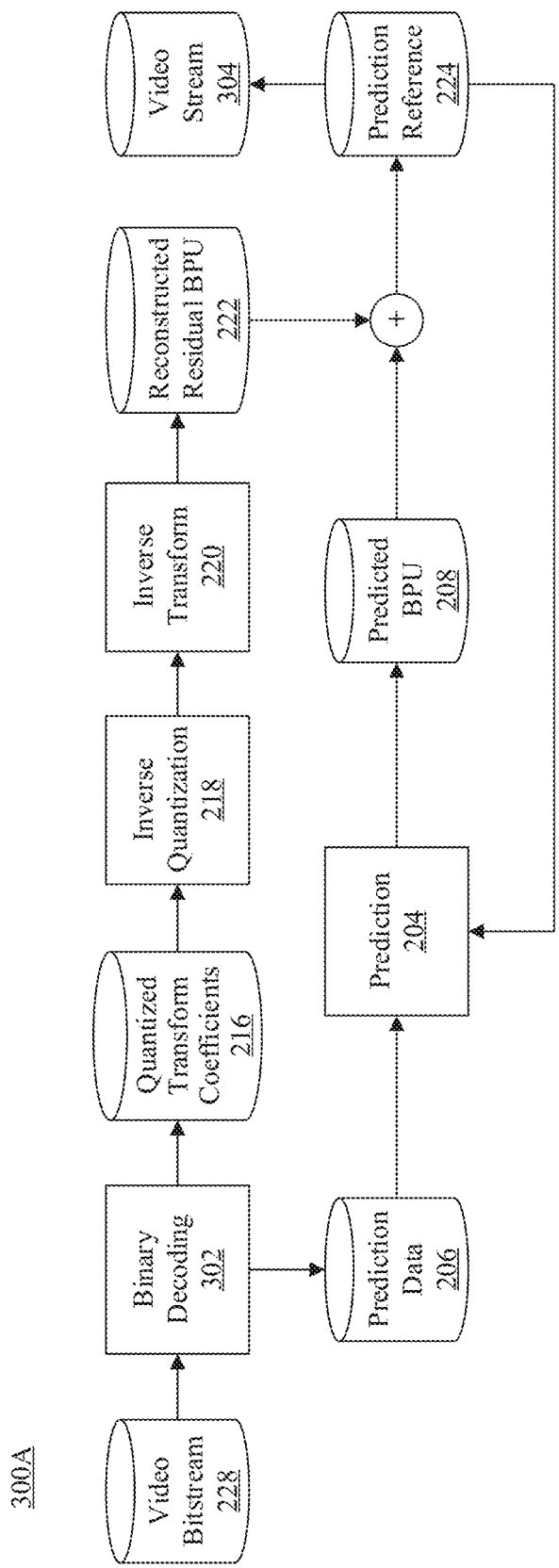
FIG. 3A shows a schematic of an example decoding process, consistent with some embodiments of the present disclosure.

FIG. 3A shows a schematic of an example decoding process, according to some embodiments of the present disclosure. As shown in FIG. 3A, process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
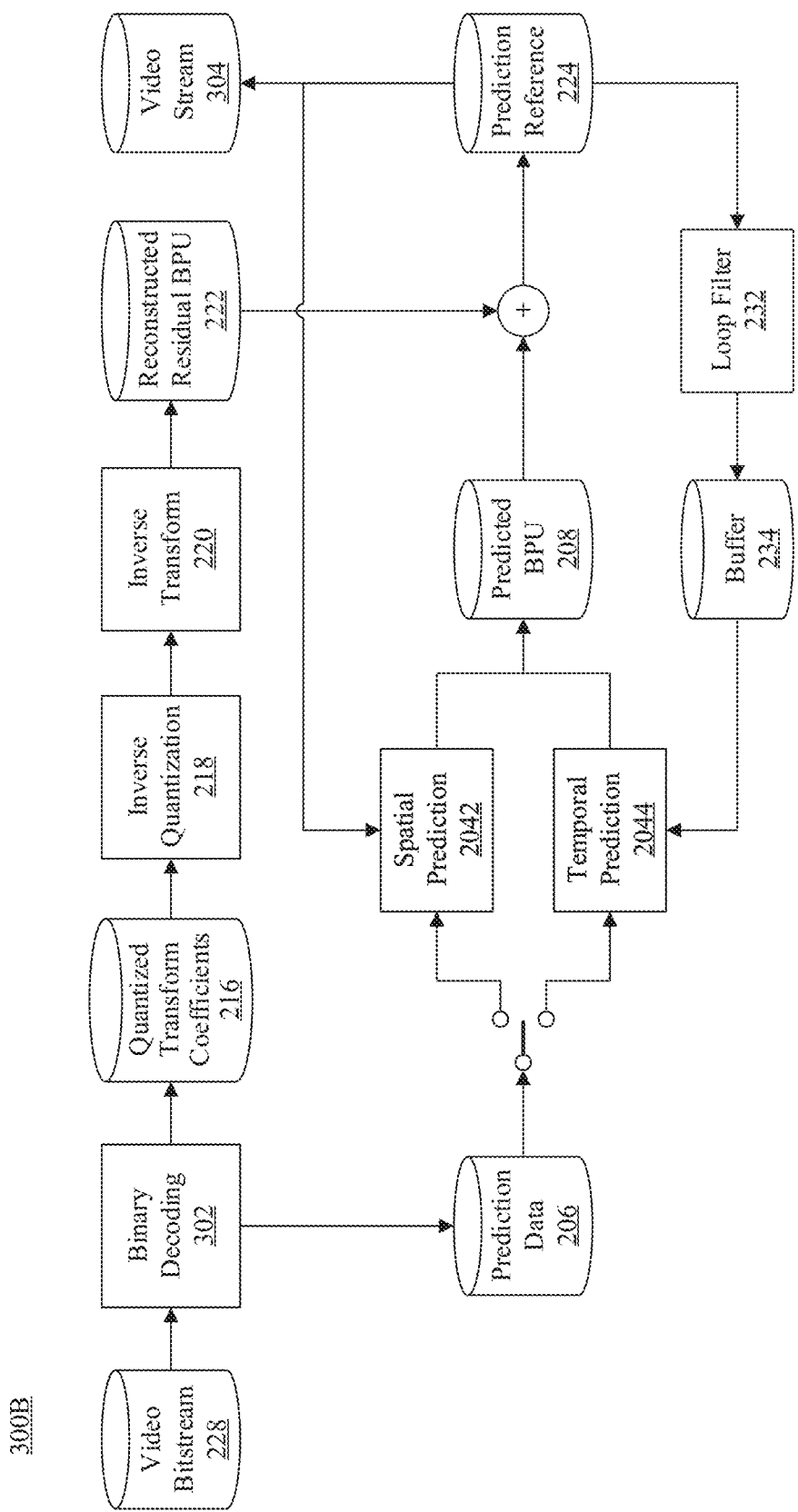
FIG. 3B shows a schematic of another example decoding process, consistent with some embodiments of the present disclosure.

FIG. 3B shows a schematic of another example decoding process, according to some embodiments of the present disclosure. As shown in FIG. 3B, process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

There can be four types of loop filters. For example, the loop filters can include a deblocking filter, a sample adaptive offsets ("SAO") filter, a luma mapping with chroma scaling ("LMCS") filter, and an adaptive loop filter ("ALF"). The order of applying the four types of loop filters can be the LMCS filter, the deblocking filter, the SAO filter, and the ALF. The LMCS filter can include two main components. The first component can be an in-loop mapping of the luma component based on adaptive piecewise linear models. The second component can be for the chroma components, and luma-dependent chroma residual scaling can be applied.

Figure 4:
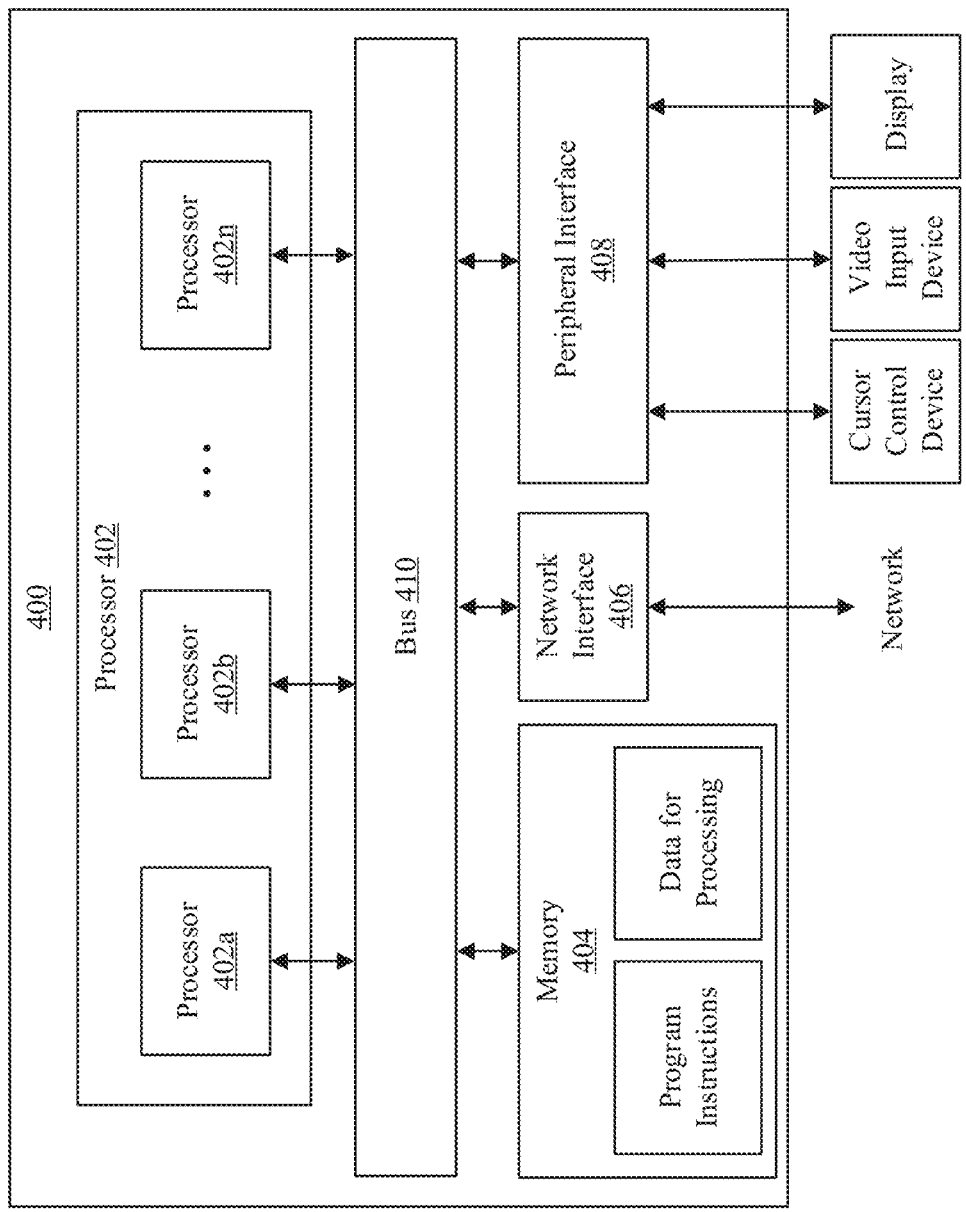
FIG. 4 shows a block diagram of an example apparatus for encoding or decoding a video, consistent with some embodiments of the present disclosure.

FIG. 4 shows a block diagram of an example apparatus for encoding or decoding a video, according to some embodiments of the present disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface communicatively coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. Initial QP values used for coding of a picture or slice can be signaled at the high level, for example, using init_qp_minus26 syntax element in the Picture Parameter Set (PPS) and using slice_qp_delta syntax element in the slice header. Further, the QP values can be adapted at the local level for each CU using delta QP values sent at the granularity of quantization groups.

The Alliance for Open Media (AOMedia), is an industry consortium founded in 2015. AV1 is the first video coding standard developed by AOMedia. The first version of AV1 is released in 2018. In 2019, AOMedia has started to work on developing its next generation codec. The goal of the AOMedia next generation codec is to achieve significant compression gain as compared to conventional codecs.

Figure 5:
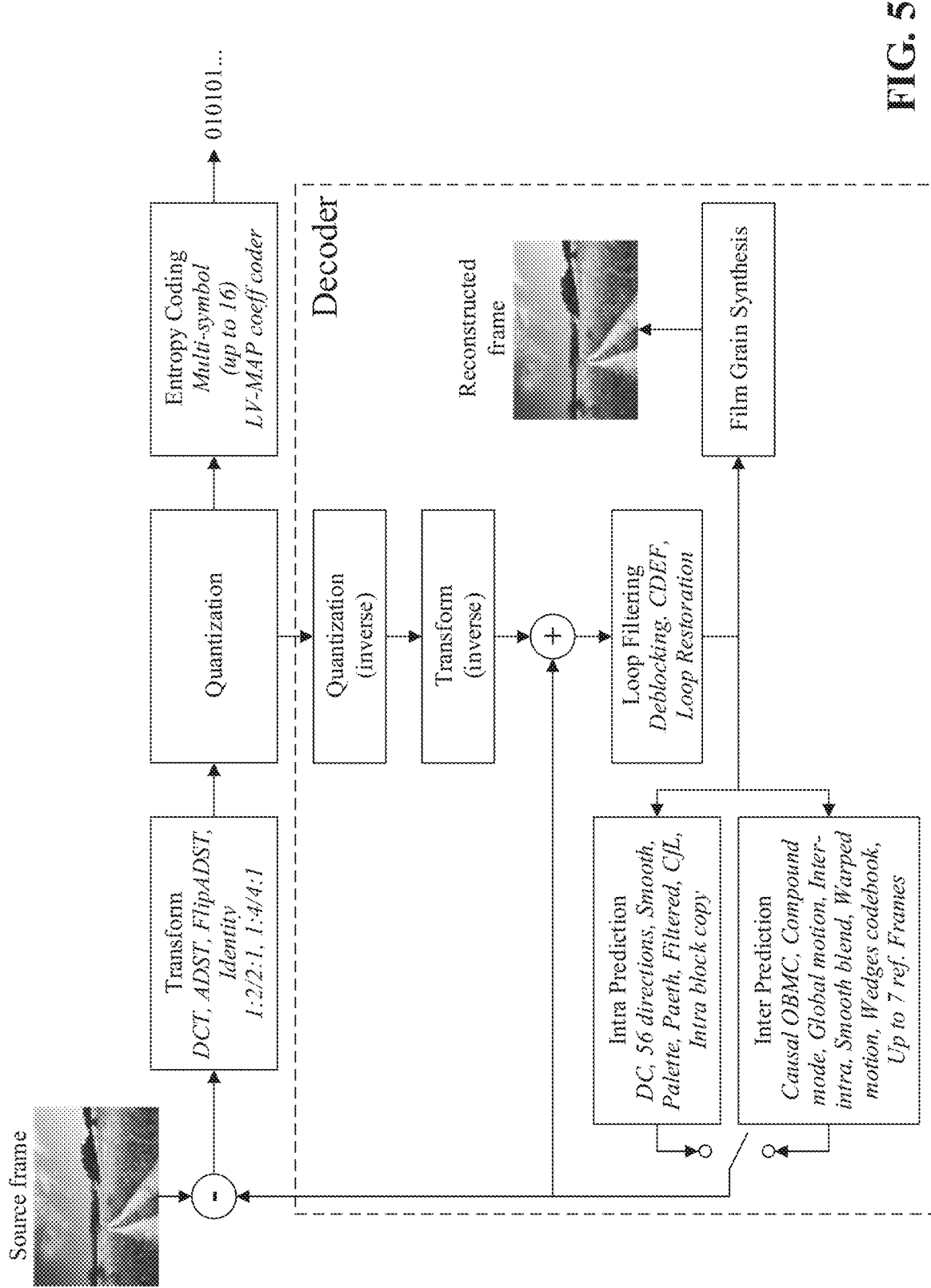
FIG. 5 is a block diagram of an exemplary AV1 video coding system, consistent with some embodiments of the present disclosure.

AV1 is based on the same hybrid video coding system that has been used in modern video compression standards such as HEVC, H.264/AVC, MPEG2, H.263, etc. FIG. 5 shows a block diagram of a AV1 video coding system. The input video is processed block by block.

In AV1, a super block is the largest block unit, and can be as large as 128×128 luma samples (plus the corresponding chroma samples depending on the chroma format). A superblock may be further partitioned into coding blocks using predefined partition structures. AV1 partition tree supports 10 different partitioning patterns including no split mode. At the leaf nodes of the partitioning structure, coding information such as coding mode (intra mode or inter mode), motion information (reference index, motion vectors, etc.) if inter coded, and quantized residual coefficients are sent. If intra prediction (also called spatial prediction) is used, spatial neighboring samples are used to predict the current block. If inter prediction (also called temporal prediction or motion compensated prediction) is used, samples from already coded pictures called reference pictures are used to predict the current block.

After intra or inter prediction, the mode decision and the encoder control block choose the best prediction mode for the current block, based on, for example, the rate-distortion optimization method. Based on the best prediction mode, the prediction block is generated and subtracted from the input video block. The prediction residual is sent to the transform and quantization modules to generate the quantized residual coefficients. The quantized residual coefficients will then be inverse quantized and inverse transformed to obtain the reconstructed residual. The prediction block and the reconstructed residual are added together to form the reconstructed block before loop filtering, which is used to provide reference samples for intra prediction. Loop filtering such as deblocking, constraint directional enhancement filter (CDEF), and loop restoration filter may be applied to the reconstructed blocks to form the reconstructed block after loop filtering, which is stored in the decoded picture buffer, and used to provide reference samples for inter prediction. Coding information such as coding mode (intra or inter prediction), intra prediction mode, motion information, quantized residual coefficients, etc., are sent to the entropy coding module to further reduce the bit rate before being packed into the output video bitstream.

Figure 6:
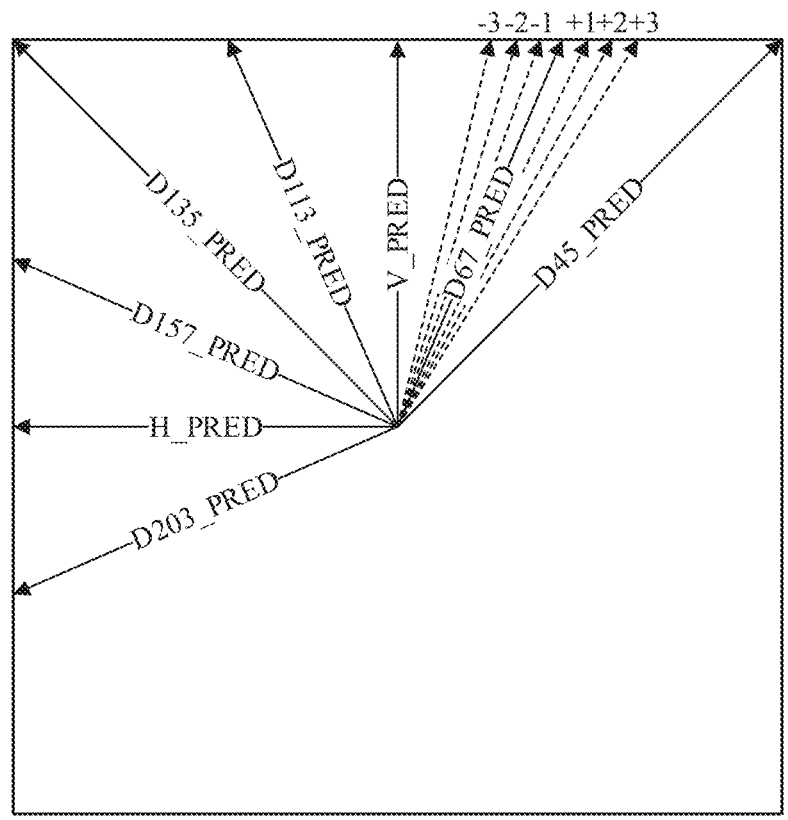
FIG. 6 is a schematic diagram illustrating directional intra modes of AV1, consistent with some embodiments of the present disclosure.

To capture the arbitrary edge directions presented in the natural video, a number of directional intra modes are introduced in AV1. AV1 directional intra prediction modes are represented by nominal modes and angle delta. The nominal modes are similar set of intra prediction angles used in VP9, which includes 8 angles. The index value of angle delta is ranging from −3 to +3, and zero delta angle indicates a nominal mode. The prediction angle is represented by a nominal intra angle plus an angle delta. In total, there are 56 directional intra prediction modes, as shown in FIG. 6. In the FIG. 6, solid arrows indicate nominal modes and dotted arrows represent non-zero angle delta.

In addition to directional modes, AV1 also supports non-directional intra modes such as DC, SMOOTH V, SMOOTH H, SMOOTH, PAETH mode. In SMOOTH mode, the prediction is performed using quadratic interpolation in vertical or horizontal directions, or the average thereof, after approximating the right and bottom edges. In the PAETH predictor, the predicted value is computed as follows. For each pixel position, a variable paethValue is computed as paethValue=topRef+leftRef−topleftRef, where topRef, leftRef, and topleftRef are the reference samples of top, left and top-left position, respectively. Moreover, for each pixel position, the final predicted value is selected from one of the three (topRef, leftRef and topleftRef) candidates reference samples, which is closest to the paethValue.

AV1 intra prediction also supports recursive-filtering-based intra predictor (called filter intra modes) to capture decaying spatial correlation with references on the edges. The filter intra modes are designed for luma blocks by viewing them as 2-D non separable Markov processes. Five filter intra modes are pre-designed for AV1, each represented by a set of eight 7-tap filters reflecting correlation between pixels in a 4×2 patch and 7 neighbors adjacent to it. An intra block can pick one filter intra mode and be predicted in batches of 4×2 patches. Each patch is predicted via the selected set of 7-tap filters weighting the neighbors differently at the 8-pixel locations.

Conventional designs of intra-prediction of AV1 have the following drawbacks. In natural video sequence, the neighboring pixels are highly correlated. However, in the AV1 intra prediction process, the predicted blocks generated by some of the prediction modes may produce discontinuity between the neighboring samples, which ultimately may impact the accuracy of the prediction.

In particular, some of the prediction modes of AV1 intra prediction may produce discontinuity between the reference and predicted samples at the top and left boundary. For instance, the DC mode may produce discontinuity both in top and left boundary samples. The horizontal and vertical modes may produce the discontinuity between top and left boundary, respectively. Therefore, filtering the boundary samples may improve the accuracy of the predictions. The present disclosure provides methods for solving some or all above problems.

Figure 7:
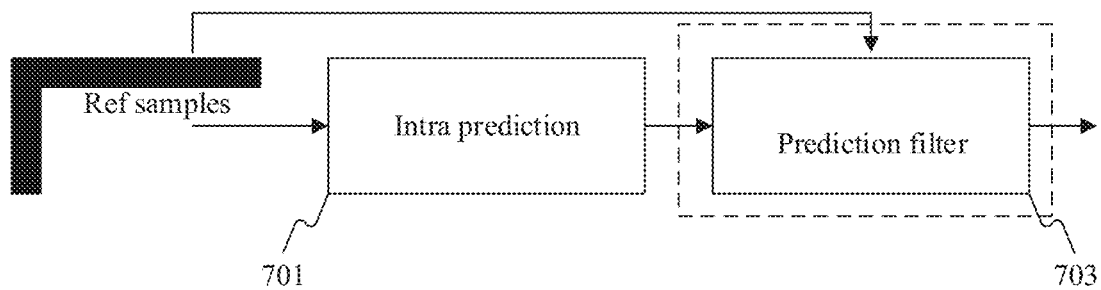
FIG. 7 is a schematic diagram illustrating an exemplary method for filtering intra prediction samples using neighboring samples where the predicted samples is refined by adding the offset value, consistent with some embodiments of the present disclosure.

FIG. 7 is a schematic diagram illustrating an exemplary method for refining intra prediction samples using neighboring samples, consistent with the disclosed embodiments. As shown in FIG. 7, after generating the intra prediction samples (701), the prediction samples are filtered through prediction filter 703 using neighboring samples. Prediction filter 703 is the additional operation added to the conventional AV1 intra prediction.

Next, some exemplary embodiments for filtering intra prediction samples are described in detail.

In some disclosed embodiments, the refinement of intra predicted samples may be performed at sub-block level. Specifically, an intra predicted block is divided into integer number of sub-blocks. Each sub-block has a size of M×N pixels. For each sub-block, the filtering is performed from top and left neighboring samples of that sub-blocks. If a sub-block width is M and height is N, then the number of filter taps is M+N+2 (M top neighbors, N left neighbors, 1 top-left neighbor, 1 current sample).

Figure 8:
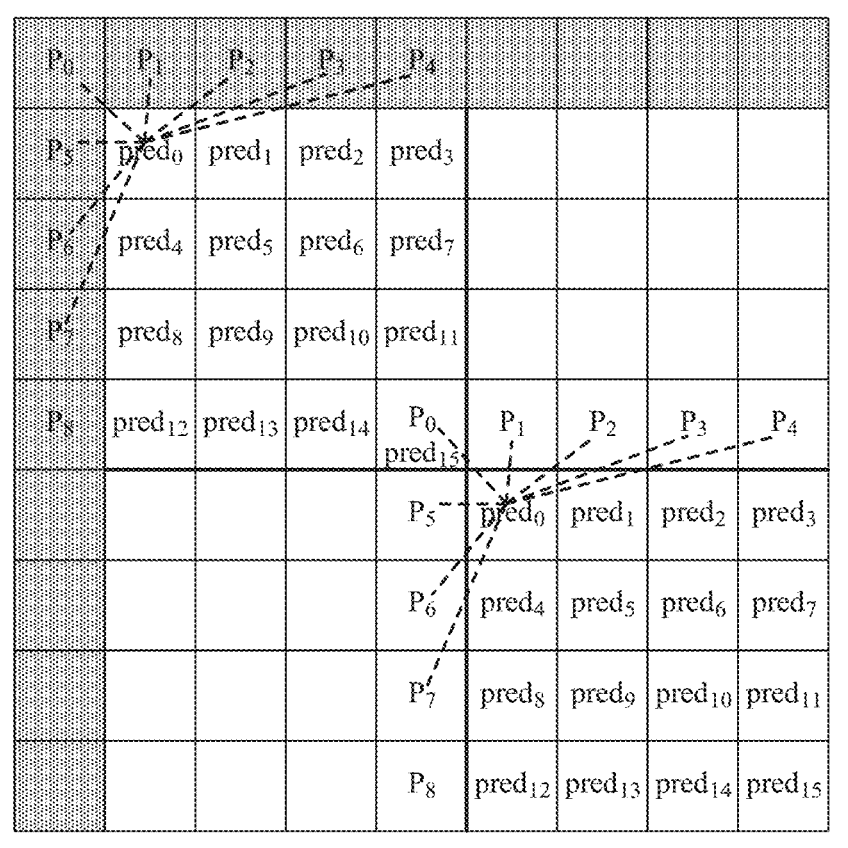

FIG. 8 illustrates exemplary sub-block level refinement (which can also be called offset-based refinement of intra prediction) with M=4 and N=4, consistent with the disclosed embodiments. In FIG. 8, an 8×8 prediction block is divided into four 4×4 sub-blocks. The prediction samples within a sub-block are filtered from the top and left neighboring samples. For ease of description, the following notations are used.

$P_n$ is the n-th un-filtered neighboring sample of a sub-block. The position of the neighboring sample P& are shown in FIG. 8. The value of n is varied from 0 to (M+N), inclusive.

$pred_k$ is the k-th unfiltered predicted sample of the sub-block in the raster scan order. The value of k is 0 to (M×N−1) inclusive.

$W_{kn}$ is the filter weight of the n-th un-filtered neighboring sample of the k-th (raster scan order) sample of a sub-block.

$filteredpred_k$ is the k-th filtered predicted sample of the sub-block in the raster scan order. The value of k is 0 to (M×N−1) inclusive.

The step-by-step algorithm to generate the filtered predicted sample is given below. An offset is generated from the neighboring predicted sample. Specifically, regarding a sub-block in the intra-predicted block, for each pixel position within the sub-block (for k=0 to M×N−1), the filtered sampled can be generated as follows:

$$\text{Offset}_k = (\Sigma_{n=0}^{(M+N)}(W_{kn} \times (P_n - pred_k))) \qquad \text{Eq. (1)}$$

$$filteredpred_k = pred_k + (\text{Offset}_k + c) >> shift \qquad \text{Eq. (2)}$$

In the above equations, c is the round offset and can be defined as $2^{shift-1}$. The filter weight values $W_{kn}$ and the value of shift are derived in such a way that following condition is satisfied:

$$(\Sigma_{n=0}^{(M+N)} W_{kn}) \leq 2^{shift} \qquad \text{Eq. (3)}$$

FIG. 9 shows an example of the filter weight values when shift=6, sub-block size is 4×4.

In some disclosed embodiments, the proposed filter can also be implemented as follows:

$$filteredpred_k = (W_{pred,k} \times pred_k + \Sigma_{n=0}^{(M+N)}(W_{kn} \times P_n) + c) >> shift \qquad \text{Eq. (4)}$$

where $W_{pred,k}$ is the filter weight of the k-th current sample and defined as follows:

$$W_{pred,k} = 2^{shift} - \Sigma_{n=0}^{(M+N)}(W_{kn}) \qquad \text{Eq. (5)}$$

In some disclosed embodiments, the proposed sub-block level refinement is selectively applied only in the top and left boundary samples. The number of top rows and left columns can be selected based on the block size and prediction mode. FIGS. 10(a)-10(c) illustrate the proposed mode dependent boundary filtering method. The proposed sub-block level filtering is applied only to the samples in the boundary areas (e.g., areas 1001 and 1003). Specifically, as shown in FIG. 10(a), for DC and smooth modes, the proposed filter is applied to both top boundary samples 1001 and left boundary samples 1003. As shown in FIG. 10(b), in case of horizontal and smooth horizontal mode, the filter is applied in the top boundary 1001 only. As shown in FIG. 10(c), in case of vertical and smooth vertical mode, the filter is applied in the left boundary 1003 only.

Assuming h, and w are the block height and width, respectively, the number of filtered top-rows ($N_{filteredtopRow}$) can be computed based on the following:

In case of vertical prediction (V_PRED) and smooth vertical (SMOOTH_V) prediction mode
$N_{filteredtopRow}$=0 else,
$N_{filteredtopRow}$ mi (4, h>>2)

Therefore, the number of filtered left-column ($N_{filteredleftColumn}$) can be computed based on the following:
In case of horizontal prediction (H_PRED) or smooth horizontal (SMOOTH_H) prediction mode
$N_{filteredleftColumn}=0$
else,
$N_{filteredleftColumn}=\min(4,w>>2)$ In some disclosed embodiments, the proposed filtering method is enabled only for pre-defined intra-prediction modes. The set of prediction modes for which the proposed filter is enabled can be selected based on some experimental analysis. An example of mode-dependent enable/disabling is shown in FIG. 11. As shown in FIG. 11, if the prediction mode is equal to one of DC, SMOOTH_V, SMOOTH_H, SMOOTH, HOR, VER, or filter intra mode, the proposed sub-block level filtering is enabled, otherwise, the filtering is disabled.

The intra prediction process of AV1 specification can be modified as shown in following steps of the intra prediction process. A 2D array named pred containing the intra predicted samples is constructed as follows:
If plane is equal to 0 and use_filter_intra is true, the recursive intra prediction process specified in section 7.11.2.3 is invoked with w and h as inputs, and the output is assigned to pred.
Otherwise, if is_directional_mode(mode) is true, the directional intra prediction process specified in section 7.11.2.4 is invoked with plane, x, y, haveLeft, haveAbove, mode, w, h, maxX, maxY as inputs and the output is assigned to pred.
Otherwise if mode is equal to SMOOTH_PRED or SMOOTH_V_PRED or SMOOTH_H_PRED, the smooth intra prediction process specified in section 7.11.2.6 is invoked with mode, log 2 W, log 2H, w, and h as inputs, and the output is assigned to pred.
Otherwise if mode is equal to DC_PRED, the DC intra prediction process specified in section 7.11.2.5 is invoked with haveLeft, haveAbove, log 2 W, log 2H, w, and h as inputs and the output is assigned to pred.
Otherwise (mode is equal to PAETH_PRED), the basic intra prediction process specified in section 7.11.2.2 is invoked with mode, w, and h as inputs, and the output is assigned to pred.

The following steps are the proposed changes to the current AV1 specification:
if mode is equal to DC, or SMOOTH_PRED or SMOOTH_V_PRED or SMOOTH_H_PRED, or (V_PRED and angleDelta equal to 0) or (H_PRED and angleDelta equal to 0) or use_filter_intra is true, the proposed sub-block based intra filtering process specified in the following section is invoked with mode, w, h, LeftCol, AboveRow, pred, and w as inputs, and the output is assigned to predFiltered, where predFiltered containing the filtered intra predicted samples.
The current frame is updated as follows:
CurrFrame[plane][y+i][x+j] is set equal to predFiltered [i][j] for i=0 . . . h−1 and j=0 . . . w−1.
Otherwise, the current frame is updated as follows:
CurrFrame[plane][y i][x+j] is set equal to pred[i][j] for i=0 . . . h−1 and j=0 . . . w−1.
An example of the step-by-step process to generate the filtered samples using proposed method is given below. In the following example, it is assuming that sub-block size is 4×4.
The inputs to this process are:
a variable mode specifying the type of intra prediction to apply,
a variable w specifying the width of the region to be predicted,
a variable h specifying the height of the region to be predicted.
a 1D array LeftCol containing left reference samples
a 1D array AboveRow containing above reference samples
a 2D array named pred containing unfiltered predicted samples
a 2D array named w containing filter weight matrix.
The output of this process is a 2D array named predFiltered containing the filtered intra predicted samples. The variables widthThreshold is derived as follows:
if (mode==SMOOTH_H_PRED||mode==H_PRED|| filter_intra_mode==FILTER_H_PRED)
widthThreshold is set to 0
Otherwise,
widthThreshold is set to min((w>>2), 4).
The variables heightThreshold is derived as follows:
if (mode==SMOOTH_V_PRED||mode==V_PRED|| filter_intra_mode==FILTER_V_PRED)
heightThreshold is set to 0
Otherwise,
heightThreshold is set to min((h>>2), 4).
The following steps apply for r=0 . . . h−1 with step 4, for c=0 . . . w−1, with step 4:
The array p is derived as follows for i=0 . . . 8:
If i is less than 5, p[i] is derived as follows:
If r is equal to 0, p[i] is set equal to AboveRow [r−1+i].
Otherwise, if c is equal to 0 and i is equal to 0, p[i] is set equal to LeftCol[c−1].
Otherwise, p[i] is set equal to pred[r−1][c−1+i].
Otherwise (i is greater than or equal to 5), p[i] is derived as follows:
If c is equal to 0, p[i] is set equal to LeftCol[c+ i−5].
Otherwise (c is not equal to 0), p[i] is set equal to pred[r+i−5][(c−1].
The following steps apply for k=0 . . . 15:
The variable r_pos is set equal to (r+(k>>2)).
The variable c_pos is set equal to c+(k & 0x03)
if c_pos <=widthThreshold OR r_pos <=heightThreshold
The variable offset is set equal to 0
for i=0 . . . 8, the variable offset is updated as follows:
Offset+=w[k][i]*(p[i]−pred[r_pos][c_pos]);
predFiltered[r_pos][c_pos] is set to Clip1(pred [r_pos][c_pos]+(Offset+32)>>6)
Otherwise,
predFiltered[r_pos][c_pos] is set to pred[r_pos] [c_pos]

The present disclosure also provides embodiments for decoder side filter ON/OFF control without signaling in the bit-stream. In some embodiments, the proposed sub-block level filtering is dynamically enabled or disabled based on the characteristics of the reference samples. Since the reference samples are already available in the decoder side, encoder does not require to signal any flag to indicate ON/OFF. In the proposed method, if the mean absolute gradient of the reference samples is larger than the pre-defined threshold, the proposed sub-block level filter is enabled. Otherwise (if the mean absolute gradient of the reference sample is less than or equal to threshold), the proposed sub-block level filter is disabled.

It is assumed that:
LeftCol is an 1D array containing left reference samples;
AboveRow is an 1D array containing above reference samples;
w is the width of the block; and
h is the height of block.

Then, mean absolute gradient (meanAbsGrad) of the reference samples are computed as follows:
The variable gradSumAbove is set equal to 0
The variable gradSumLeft is set equal to 0
for i=−1 . . . w−2, the variable gradSumAbove is updated as follows:
gradSumAbove+=abs(AboveRow[i]−AboveRow[i+1]);
for j=−1 . . . h−2, the variable gradSumLeft is updated as follows:
gradSumLeft+=abs(LeftCol [j]−LeftCol [j+1]);
meanAbsGrad=(gradSumAbove+gradSumLeft)/(w*h)

The filter selection can be performed as follows:
if (meanAbsGrad>T)
Proposed filter is enabled
Otherwise (meanAbsGrad <=T)
Proposed filter is disabled The threshold value (T) can be defined based on experiments.

In some disclosed embodiments, the second order gradient (i.e., gradient of the gradient) can be used to enable/disable the proposed filtering. The step-by-step algorithm to enable/disable the proposed filtering using second order gradient is given below:
Set all elements in a 1-D array gradAbove is equal to 0
Set all elements in a 1-D array gradLeft is equal to 0
for i=−1 . . . w−2, the array gradAbove is updated as follows:
gradAbove[i+1]=AboveRow[i]−AboveRow[i+1];
for j=−1 . . . h−2, the array gradLeft is updated as follows:
gradLeft [j+1]=LeftCol [j]−LeftCol [j+1];
The variable gradSumAbove2nd is set equal to 0
The variable gradSumLeft2nd are set equal to 0
for i=0 . . . w−2, the variable gradSumAbove2nd is updated as follows:
gradSumAbove2nd+=abs(gradAbove [i]−gradAbove [i+1]);
for j=0 . . . h−2, the variable gradSumLeft2nd is updated as follows:
gradSumLeft2nd+=abs(gradLeft [j]−gradLeft [j+1]);
meanAbsGrad2nd=(gradSumAbove2nd+gradSumLeft2nd)/(w*h)

The filter selection can be performed as follows:
if (meanAbsGrad2nd >T)
Proposed filter is enabled
Otherwise (meanAbsGrad2nd <=T)
Proposed filter is disabled In some disclosed embodiments, the proposed filtering method can also be enabled/disabled based on the other characteristics of the reference samples such as variance and standard deviation.

To a person skilled in the art, the methods of calculating gradient given above are merely exemplary. Other methods of gradient calculation may be used. For example, low-pass filtering of the reference samples may be performed before gradient is computed. Other methods of gradient filtering may be used in place of simply taking the difference between two reference samples.

Figure 12:
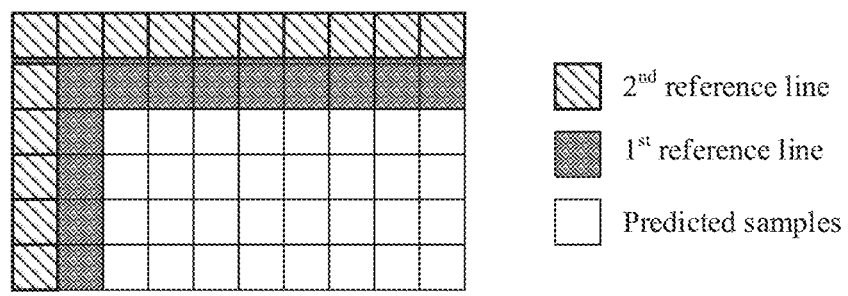
FIG. 12 is a schematic diagram illustrating reference line-based filter selection, consistent with some embodiments of the present disclosure.

In some disclosed embodiments, the multiple reference lines are used to select if the proposed filter is enabled or disabled. FIG. 12 shows the illustration of this concept. As shown in FIG. 12, the first and the second reference lines are already reconstructed before predicting the current block.

The following are the step-by-step method of proposed filter selection.
It is assumed that:
LeftCol1 is the 1D array containing the reconstructed pixels of the left part of the first reference line.
LeftCol2 is the 1D array containing the reconstructed pixels of the left part of the second reference line.
AboveRow1 is the 1D array containing the reconstructed pixels of the top part of the first reference line.
AboveRow2 is the 1D array containing the reconstructed pixels of the top part of the second reference line.

For a given intra prediction mode,
Assume proposed sub-block filter is disabled.
A predicted version of the first reference sample is generated by considering the second reference line as reference. Assume, PredLeftCol1 and PredAboveRow1 are the predicted values of the left and top part of the first reference line using AboveRow2 and LeftCol2 as reference sample.
Compute the sum-of-absolute difference between reconstructed and predicted first reference sample, as follows:
Set the variable SADNoFilter to 0
for i=0 . . . w−1, the variable SADNoFilter is updated as follows:
SADNoFilter+=abs(AboveRow1[i]−PredAboveRow1 [i])
for j=0 . . . h−1, the variable SADNoFilter is updated as follows:
SADNoFilter+=abs(LeftCol1[i]−PredLeftCol1 [i])
Assume proposed sub-block filter is enabled.
A predicted version of the first reference sample is generated by considering the second reference line as reference. Assume, PredFiltLeftCol1 and PredFiltAboveRow1 are the predicted values of the left and top part of the first reference line using AboveRow2 and LeftCol2 as reference sample.
Compute the sum-of-absolute difference between reconstructed and predicted first reference sample, as follows:
Set the variable SADWithFilter to 0
for i=0 . . . w−1, the variable SADWithFilter is updated as follows:
SADWithFilter+=abs(AboveRow1[i]−PredFiltAboveRow1 [i])
for j=0 . . . h−1, the variable SADNoFilter is updated as follows:
SADWithFilter+=abs(LeftCol1[i]−PredFiltLeftCol1 [i])
If (SADNoFilter <=SADWithFilter)
Proposed filter is disabled.
Otherwise, (SADNoFilter >SADWithFilter)
Proposed filter is enabled.

The present disclosure also provides embodiments for filter ON/OFF control with signaling in the bit-stream. In some disclosed embodiments, the encoder sends a flag in the bit-stream to indicate if the proposed filter is enabled or disabled. The signaling is performed in the prediction block level. The proposed flag, use_intra_pred_filter, is signaled after the signaling of the filter intra mode information. The semantics of the proposed flag are given below:

use_intra_pred_filter equal to 1 specifies that the sub-block based intra prediction filter is used. use_intra_pred_filter equal to 0 specifies that the sub-block based intra prediction is not used. If not present, the value of use_intra_pred_filter is inferred to be 0.

If the block is coded as ibc or palette mode, the proposed flag is not signaled. If the value of use_intra_pred_filter is equal to 1, the filtering is applied to the prediction samples. If the value of use_intra_pred_filter is equal to 0, the filter is not applied to that block. FIG. 13 shows an exemplary syntax of the proposed method in the context of an intra coded frame, and FIG. 14 shows an exemplary syntax of the proposed method in the context of an intra coded block in an inter coded frame. In FIGS. 13 and 14, the portions shown in bold are changes to the AV1 specification.

In some disclosed embodiments, the proposed flag use_intra_pred_filter is signaled only for specific set of modes. For instance, if YMode is equal to DC or SMOOTH or SMOOTH_H or SMOOTH_V or VER or HOR or filter intra mode, use_intra_pred_filter flag is signaled. Otherwise, use_intra_pred_filter is not signaled and inferred to be 0. In some embodiments, the inference value of use_intra_pred_filter flag can also depend on the prediction modes. For some modes, when the flag is not signaled, the inference value can be 0 and for some other modes the inference value can be equal to 1. FIG. 15 shows exemplary mode dependent inference values of use_intra_pred_filter syntax.

In some disclosed embodiments, the inference value of use_intra_pred_filter flag can also be defined based on the value of the type of the filter intra mode used for prediction. In AV1, 5 types of filter intra modes are supported. FIG. 16 shows an example of inference values of use_intra_pred_filter based on type of the filter intra modes.

In some disclosed embodiments, the proposed filtering method can be enabled/disabled based on the color component and/or prediction modes. For instance, in case of DC prediction, the proposed sub-block based filtering can be enabled only for luma components and disabled for chroma components. FIG. 17 shows exemplary inference values of use_intra_pred_filter flag based on prediction mode and color component.

In some disclosed embodiments, the proposed filter method is signaled in the bit-stream as an additional angle delta instead of signaling a separate flag. In AV1, the value of angle_delta is a signed integer and range is −3 to +3. In the proposed method, the angle_delta value can be varied from −3 to +4, where angle_delta=4 means that the proposed filtering is applied to the nominal/base mode.

The semantics consistent with the proposed method are: angle_delta_y specifies the offset to be applied to the intra prediction angle specified by the prediction mode in the luma plane, biased by MAX_ANGLE_DELTA so as to encode a positive value. In some embodiments of the present disclosure, proposed changes to the angle_delta_y semantics in the AV1 specification can include angle_delta_y being equal to 4 to specify that the nominal mode with the sub-block level intra prediction filtering is being used.

Following shows the AV1 specification changes of the proposed method. The changes as compared to AV1 specification is italicized.

A 2D array named pred containing the intra predicted samples is constructed as follows:

If plane is equal to 0 and use_filter_intra is true, the recursive intra prediction process specified in section 7.11.2.3 is invoked with w and h as inputs, and the output is assigned to pred.

Otherwise, if is_directional_mode(mode) is true, the directional intra prediction process specified in section 7.11.2.4 is invoked with plane, x, y, haveLeft, haveAbove, mode, w, h, maxX, maxY as inputs and the output is assigned to pred.

Otherwise if mode is equal to SMOOTH_PRED or SMOOTH_V_PRED or SMOOTH_H_PRED, the smooth intra prediction process specified in section 7.11.2.6 is invoked with mode, log 2 W, log 2H, w, and h as inputs, and the output is assigned to pred.

Otherwise if mode is equal to DC_PRED, the DC intra prediction process specified in section 7.11.2.5 is invoked with haveLeft, haveAbove, log 2 W, log 2H, w, and h as inputs and the output is assigned to pred.

Otherwise (mode is equal to PAETH_PRED), the basic intra prediction process specified in section 7.11.2.2 is invoked with mode, w, and h as inputs, and the output is assigned to pred.

If AngleDeltaY is equal to 4, the current frame is updated as follows: CurrFrame[plane][y+i][x+j] is set equal to predFiltered [i][j] for i 0 . . . h−1 and j 0 . . . w−1.

Otherwise, the current frame is updated as follows: CurrFrame[plane][y+i][x+j] is set equal to pred[i][j] for i=0 . . . h−1 and j=0 . . . w−1.

7.11.2.4. Directional Intra Prediction Process

The inputs to this process are:
  a variable plane specifying which plane is being predicted,
  variables x and y specifying the location of the top left sample in the CurrFrame[plane] array of the current transform block,
  a variable haveLeft that is equal to 1 if there are valid samples to the left of this transform block,
  a variable haveAbove that is equal to 1 if there are valid samples above this transform block,
  a variable mode specifying the type of intra prediction to apply,
  a variable w specifying the width of the region to be predicted,
  a variable h specifying the height of the region to be predicted,
  a variable maxX specifying the largest valid x coordinate for the current plane,
  a variable maxY specifying the largest valid y coordinate for the current plane.

The output of this process is a 2D array named pred containing the intra predicted samples.

The process uses a directional filter to generate filtered samples from the samples in LeftCol and AboveRow.

The following ordered steps apply:
  1. The variable angleDelta is derived as follows:
    If AngleDeltaY is equal to 4, angleDelta is set to 0
    Otherwise (AngleDeltaY is not equal to 4)
      If plane is equal to 0, angleDelta is set equal to AngleDeltaY.
      Otherwise (plane is not equal to 0), angleDelta is set equal to AngleDeltaUV.

The variable pAngle is set equal to (Mode_To_Angle [mode]+angleDelta*ANGLE_STEP).

Next, embodiments directed to a smoothing filter for intra prediction samples are described.

Figure 18:
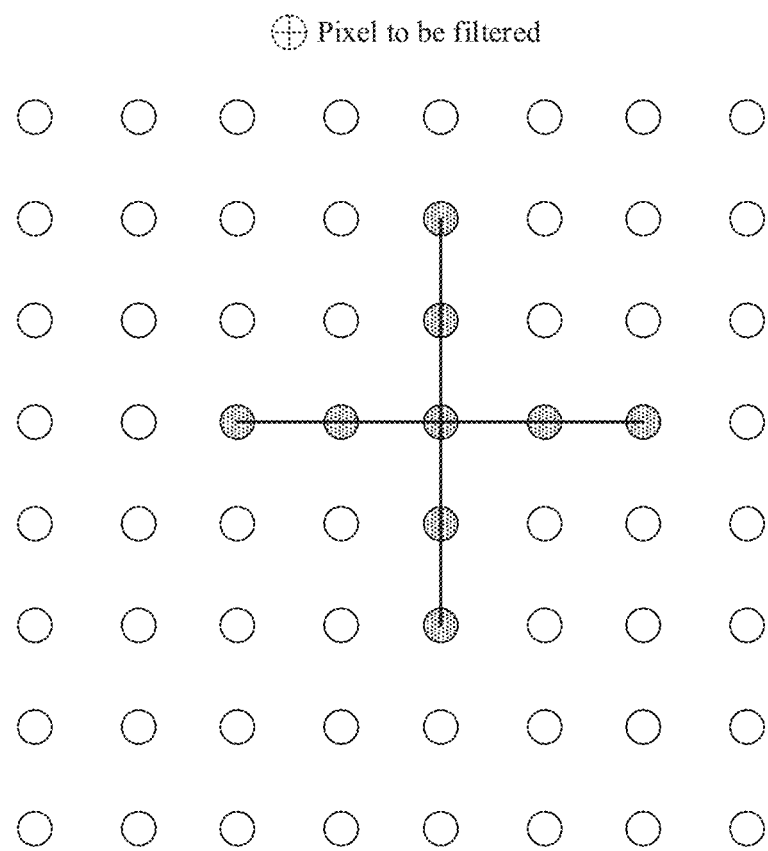
FIG. 18 is a schematic diagram illustrating an exemplary 9-tap filter, consistent with some embodiments of the present disclosure.

In natural video sequences, usually neighboring reference samples are highly correlated. In order to improve the prediction accuracy of the intra prediction process, in these embodiments, it is proposed to apply a smoothing filter in the prediction samples. An example of such a smoothing filter is shown in FIG. 18, in which a 9-tap 5×5 cross shaped filter is used to filter the predicted samples.

Assume (x,y) is the row and column position of the sample to be filtered, pred(x,y) is a predicted unfiltered sample at the (x,y) position.

The filteredPred(x,y) is the filtered predicted sample, which can be generated as follows:

A variable offset is derived as follow offset=f[0]*(pred (x−2, y)−pred (x,y))+
 f[1]*(pred (x−1, y)−pred (x,y))+
 f[2]*(pred (x, y−2)−pred (x,y))+
 f[3]*(pred (x, y−1)−pred (x,y))+
 f[4]*(pred (x, y+1)−pred (x,y))+
 f[5]*(pred (x, y+2)−pred (x,y))+
 f[6]*(pred (x+1, y)−pred (x,y))+
 f[7]*(pred (x+2, y)−pred (x,y))+
 offset=(offset+(1<<(shift2−1)))>>shift2
 filteredPred(x,y)=pred (x,y)+offset In the above example, shift2 is the normalization factor. The filter weights f is defined so that the following condition is satisfied: f[0]+f[1]+f[2]+f[3]+f[4]+f[5]+f[6]+f[7]<= (1<<shift2).

The following is an example of filter coefficient f when shift2=10: F=[28, 88, 28, 88, 88, 28, 88, 28].

In some disclosed embodiments, the proposed cross-shaped smoothing filter is applied to only specific intra prediction modes. The set of modes for which the proposed cross-shaped smoothing filter is applied, can be selected based on a preferred configuration. FIG. 19 shows an example of mode dependent smoothing filter, where proposed smoothing filter is applied to only nominal directional modes (e.g., direction modes with angle_delta=0).

In some disclosed embodiments, the proposed smoothing filter can also be applied based on the block size. For instance, if the number of pixels in the block is greater than the predefined threshold, the smoothing filter is enabled; otherwise, the filtering is disabled.

It is appreciated that the above-described embodiments may be combined.

Embodiments of the present disclosure further include methods for intra prediction methods in video coding.

Figure 20:
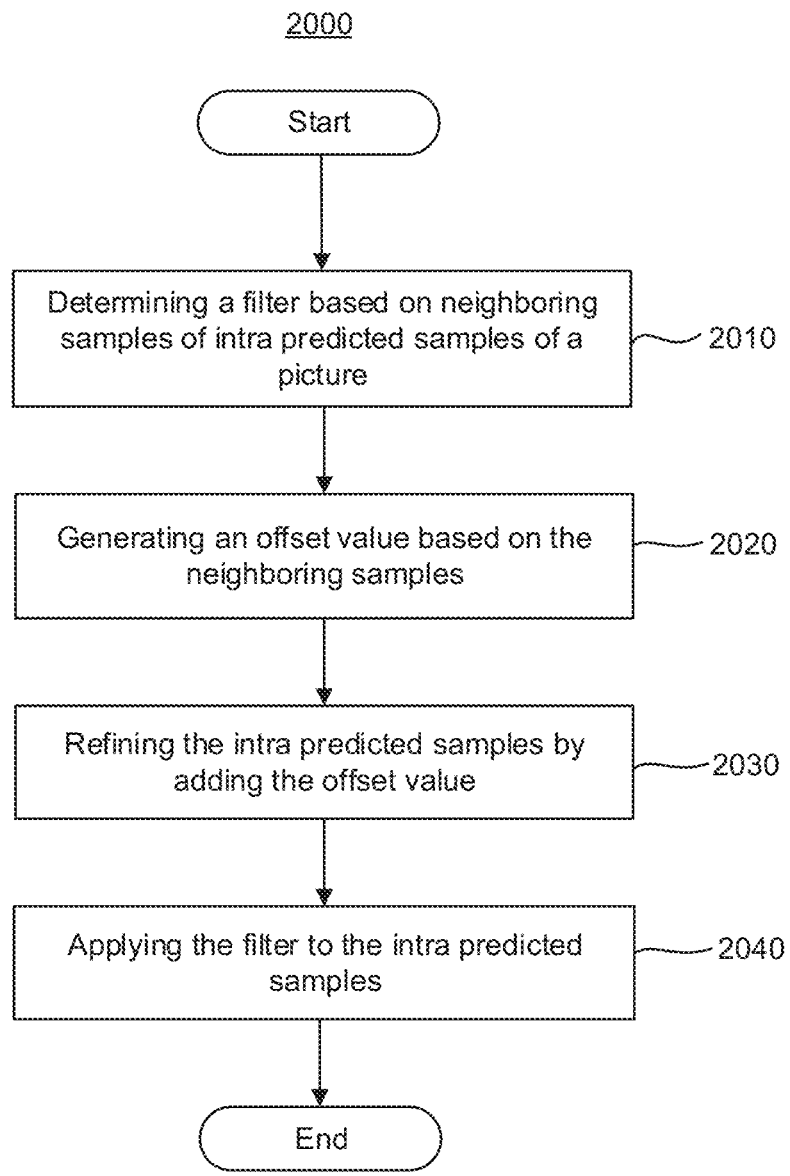
FIG. 20 illustrates an exemplary flow diagram for video processing of an intra predicted filter, consistent with some embodiments of the present disclosure.

FIG. 20 illustrates a flow chart of an exemplary method 2000 for video processing, according to some embodiments of the disclosure. Method 2000 can be performed by an encoder (e.g., by process 200A of FIG. 2A or 200B of FIG. 2B) or by a decoder (e.g., process 300A of FIG. 3A or 300B of FIG. 3B) or performed by one or more software or hardware components of an apparatus (e.g., apparatus 400 of FIG. 4). For example, one or more processors (e.g., processor 402 of FIG. 4) can perform method 2000. In some embodiments, method 2000 can be implemented by a computer program product, embodied in a computer-readable medium, including computer-executable instructions such as program code, executed by computers (e.g., apparatus 400 of FIG. 4.)

As shown in FIG. 20, according to some embodiments, in step 2010, a filter is determined based on neighboring samples of intra predicted samples of a picture. In some embodiments, the filter is determined based on top and left neighboring samples of the sub-block. For example, in FIG. 10, assume h, and w are the block height and width, respectively. Therefore, the number of filtered top-rows ($N_{filteredtopRow}$) can be computed as follows:

In case of vertical prediction (V_PRED) and smooth vertical (SMOOTH_V) prediction mode
 $N_{filteredtopRow}$=0 else,
 $N_{filteredtopRow}$=min(4,h>>2)

Therefore, the number of filtered left-column ($N_{filteredleftColumn}$) can be computed as follows:

In case of horizontal prediction (H_PRED) or smooth horizontal (SMOOTH_H) prediction mode
 $N_{filteredleftColumn}$=0 else,
 $N_{filteredleftColumn}$=min (4,w>>2)

In step 2020, an offset value is generated based on the neighboring samples. In step 2030, the intra predicted samples are refined by adding the offset value. In some embodiments, the step-by-step algorithm to generate the filtered predicted sample is given below for each sub-block in the intra-predicted block. An offset is generated from the neighboring predicted sample. For each pixel position within the sub-block (i.e., for k=0 to M×N−1). The filtered sampled can be generated as follows:

$$\text{Offset}_k = (\Sigma_{n=0}^{(M+N)}(W_{kn} \times (P_n - \text{pred}_k))) \qquad 0:1$$

$$\text{filteredpred}_k = \text{pred}_k + (\text{Offset}_k + c) >> \text{shift} \qquad 0:2$$

In the above equations, c is the round offset and can be defined as $2^{shift-1}$. The filter weight values $W_{kn}$ and the value of shift are derived in such a way that following condition is satisfied:

$$\left( \sum_{n=0}^{(M+N)} W_{kn} \right) \leq 2^{shift}$$

In step 2040, the filter is applied to the intra predicted samples. In some embodiments, for example as shown in FIG. 8, an 8×8 prediction block is divided into four 4×4 sub-blocks. The prediction samples within a sub-block are filtered from the top and left neighboring samples. As described above, $P_n$ is the n-th un-filtered neighboring sample of a sub-block. The position of the neighboring sample $P_n$ are shown in FIG. 8 The value of n is varied from 0 to (M+N), inclusive. $\text{pred}_k$ is the k-th unfiltered predicted sample of the sub-block in the raster scan order. The value of k is 0 to (M×N−1) inclusive. $W_{kn}$ is the filter weight of the n-th un-filtered neighboring sample of the k-th (raster scan order) sample of a sub-block. $\text{filteredpred}_k$ is the k-th filtered predicted sample of the sub-block in the raster scan order. The value of k is 0 to (M×N−1) inclusive.

Figure 21:
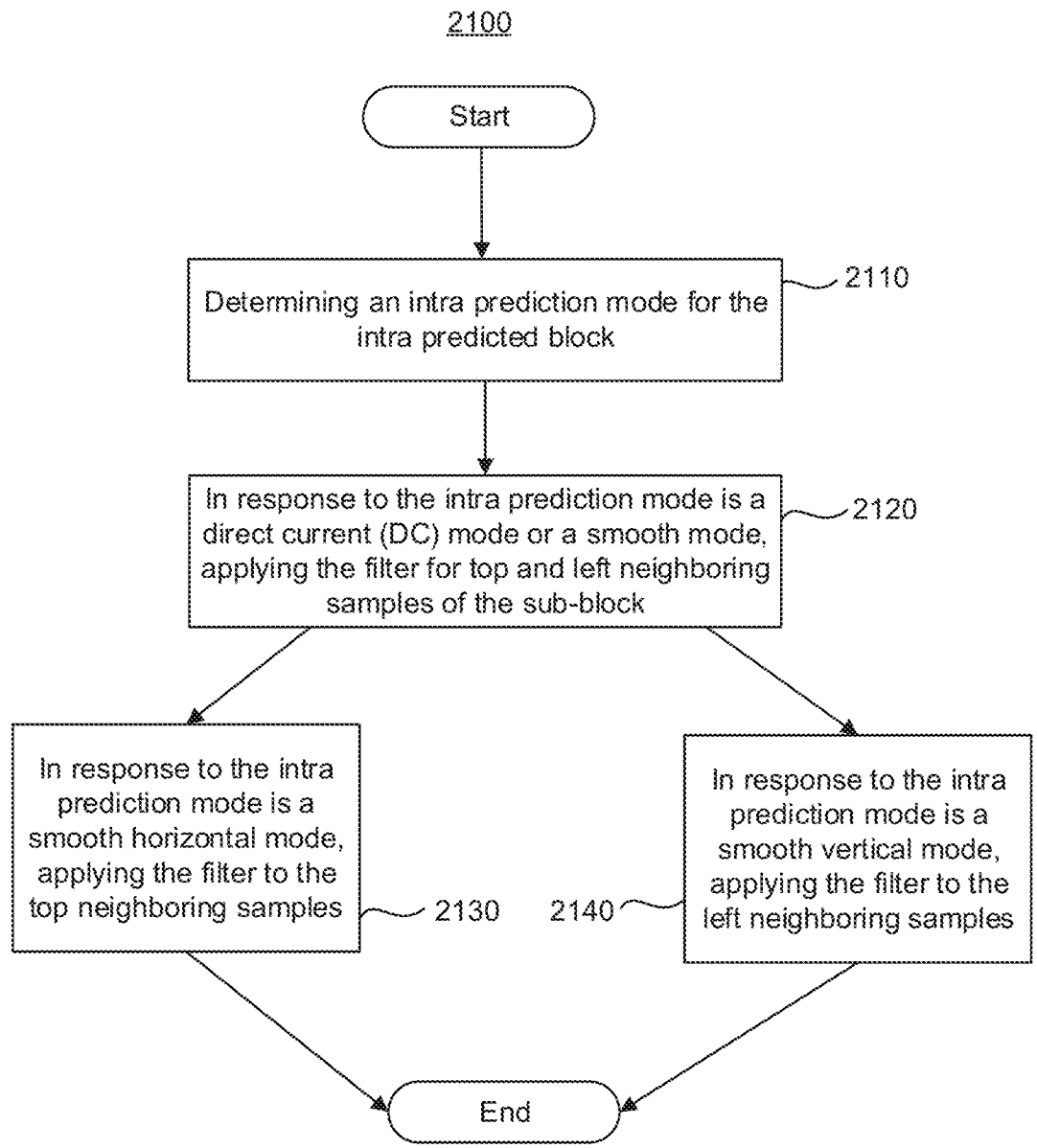
FIG. 21 illustrates an exemplary flow diagram for video processing of applying an intra predicted filter for neighboring samples of a block, consistent with some embodiments of the present disclosure.

FIG. 21 illustrates a flow chart of an exemplary method 2100 for video processing, according to some embodiments of the disclosure. Method 2100 can be performed by an encoder (e.g., by process 200A of FIG. 2A or 200B of FIG. 2B) or performed by one or more software or hardware components of an apparatus (e.g., apparatus 400 of FIG. 4). For example, one or more processors (e.g., processor 402 of FIG. 4) can perform method 2100. In some embodiments, method 2100 can be implemented by a computer program product, embodied in a computer-readable medium, including computer-executable instructions such as program code, executed by computers (e.g., apparatus 400 of FIG. 4.)

As shown in FIG. 21, according to some embodiments, in step 2110, an intra prediction mode is determined for the intra predicted block. In step 2120, in response to the intra prediction mode being a direct current (DC) mode or a smooth mode, the filter is applied for top and left neighboring samples of the sub-block. For example, in FIG. 10(a), for DC and smooth modes, the proposed filter is applied to both top boundary samples 1001 and left boundary samples 1003. In step 2130, in response to the smooth mode being a smooth horizontal mode, the filter is applied to top neighboring samples of the sub-block. For example, in FIG. 10(*b*), in case of horizontal and smooth horizontal mode, the filter is applied in the top boundary 1001 only. In step 2140, in response to the smooth mode being a smooth vertical mode, the filter is applied to left neighboring samples of the sub-block. For example, in FIG. 10(*c*), in case of vertical and smooth vertical mode, the filter is applied in the left boundary 1003 only.

Figure 10:
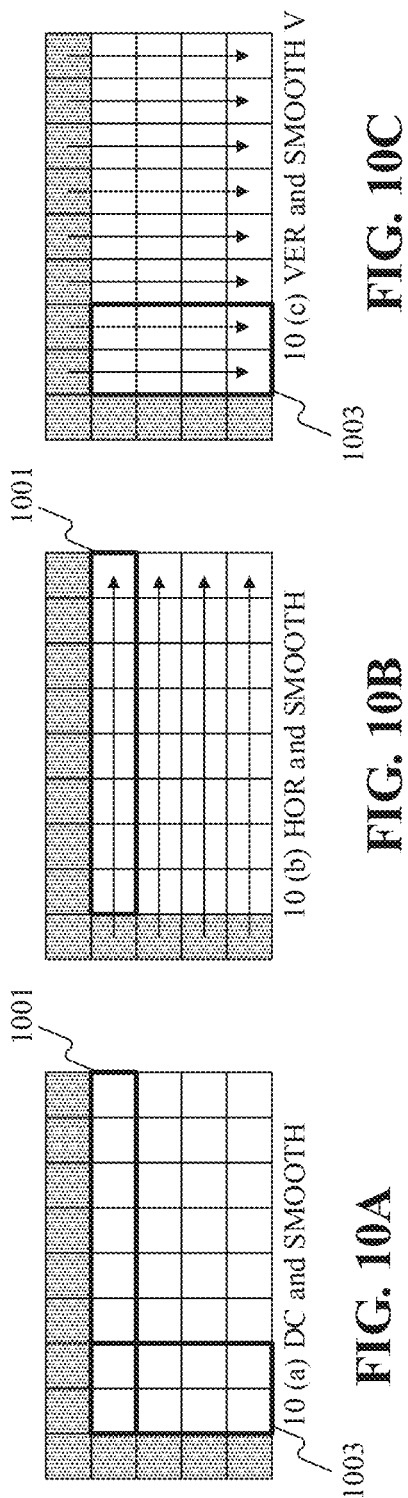
FIGS. 10(a)-10(c) illustrate filtering of an 8×4 block, consistent with some embodiments of the present disclosure.
Figure 22:
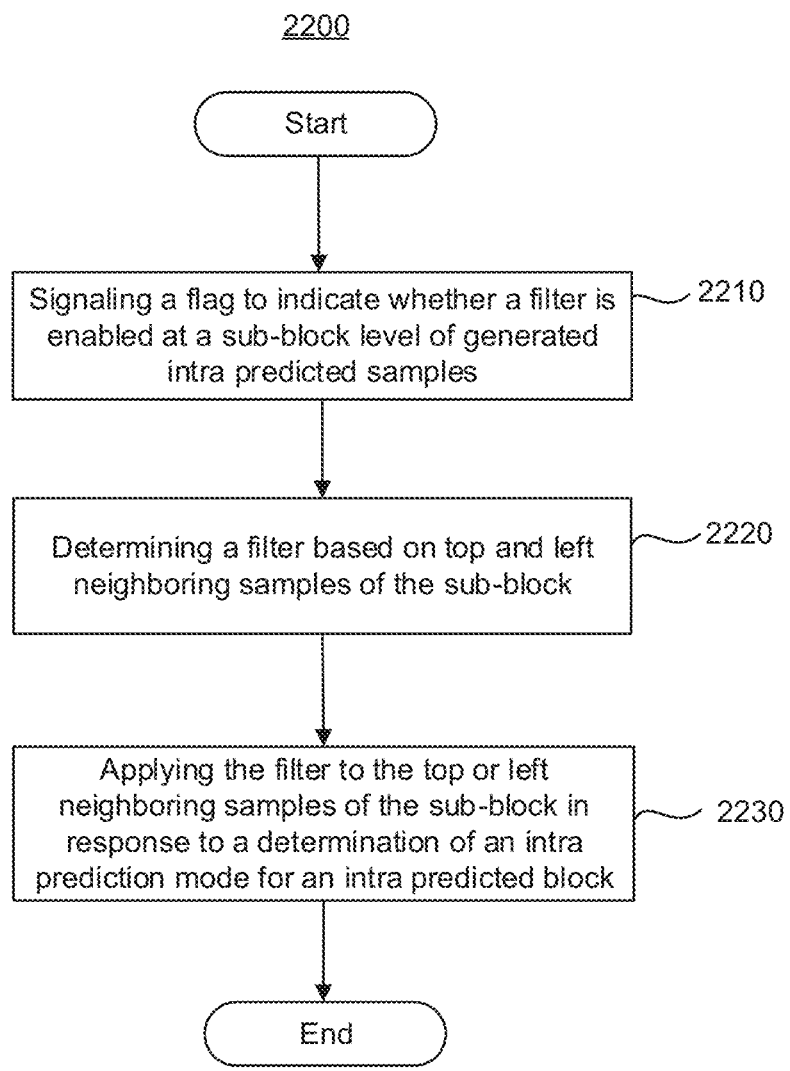
FIG. 22 illustrates an exemplary flow diagram for video processing of applying the filter to the top or left neighboring samples of the sub-block, consistent with some embodiments of the present disclosure.

In some embodiments, referring to FIGS. 10(*a*)-10(*c*), assuming h, and w are the block height and width, respectively, the number of filtered top-rows ($N_{filteredtopRow}$) can be computed as follows:

In case of vertical prediction (V_PRED) and smooth vertical (SMOOTH_V) prediction mode
$N_{filteredtopRow}=0$
else,
$N_{filteredtopRow}=\min(4,h>>2)$ Therefore, the number of filtered left-column ($N_{filteredleftColumn}$) can be computed as follows:

In case of horizontal prediction (H_PRED) or smooth horizontal (SMOOTH_H) prediction mode
$N_{filteredleftColumn}=0$
else,
$N_{filteredleftColumn}=\min(4,w>>2)$ FIG. 22 illustrates a flow chart of an exemplary method 2200 for video processing, according to some embodiments of the disclosure. Method 2200 can be performed by an encoder (e.g., by process 200A of FIG. 2A or 200B of FIG. 2B) or a decoder (e.g., by process 300A of FIG. 3A or 300B of FIG. 3B) or performed by one or more software or hardware components of an apparatus (e.g., apparatus 400 of FIG. 4). For example, one or more processors (e.g., processor 402 of FIG. 4) can perform method 2200. In some embodiments, method 2200 can be implemented by a computer program product, embodied in a computer-readable medium, including computer-executable instructions such as program code, executed by computers (e.g., apparatus 400 of FIG. 4.)

As shown in FIG. 22, in step 2210, a flag is signaled to indicate whether a filter is enabled at a sub-block level of generated intra predicted samples. For example, the encoder sends a flag, use_intra_pred_filter, in the bit-stream which is signaled after the signaling of the filter intra mode information.

In step 2220, the filter is determined based on top and left neighboring samples of the sub-block. In step 2230, the filter is applied to the top or left neighboring samples of the sub-block in response to a determination of an intra prediction mode for an intra predicted block. For example, the proposed sub-block level filtering is selectively applied in the top or left boundary samples and the number of top rows and left columns can be selected based on the prediction mode.

Figure 23:
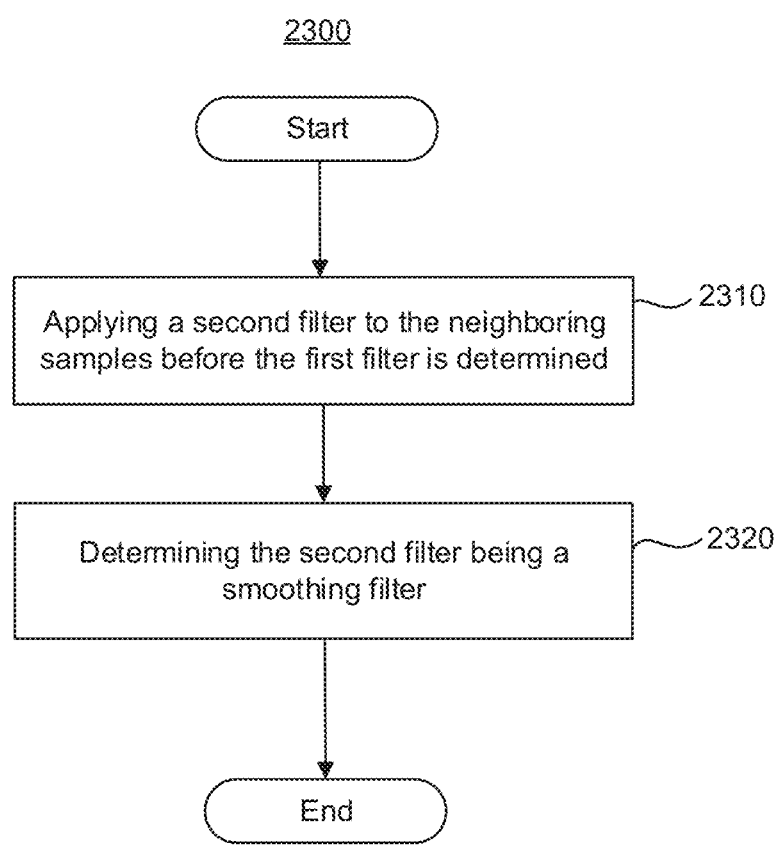
FIG. 23 illustrates an exemplary flow diagram for video processing of applying a second filter to the neighboring samples, consistent with some embodiments of the present disclosure.

FIG. 23 illustrates a flow chart of an exemplary method 2300 for video processing, according to some embodiments of the disclosure. Method 2300 can be performed by an encoder (e.g., by process 200A of FIG. 2A or 200B of FIG. 2B) or a decoder (e.g., by process 300A of FIG. 3A or 300B of FIG. 3B) or performed by one or more software or hardware components of an apparatus (e.g., apparatus 400 of FIG. 4). For example, one or more processors (e.g., processor 402 of FIG. 4) can perform method 2300. In some embodiments, method 2300 can be implemented by a computer program product, embodied in a computer-readable medium, including computer-executable instructions such as program code, executed by computers (e.g., apparatus 400 of FIG. 4.).

As shown in FIG. 23, in step 2310, a second filter is applied to the neighboring samples before the first filter is determined. For example, the second filter helps to improve the prediction accuracy of the intra prediction process when neighboring samples are highly correlated.

In step 2320, the second filter is a smoothing filter. For example, in FIG. 18, where a 9-tap 5×5 cross shaped filter is used to filter the predicted samples. Assume (x,y) is the row and column position of the sample to be filtered. pred(x,y) is the predicted unfiltered sample at (x,y) position. For example, in FIG. 19, the proposed cross-shaped smoothing filter is applied to nominal directional modes (e.g., direction modes with angle_delta=0).

The methods shown in FIGS. 20-23 are for illustrative purpose and are described from the perspective of both decoder and encoder. It is contemplated that a video encoder can perform all or a subset of the inverse operations of the decoding operations. Unless otherwise noted, techniques of video decoding described in the present disclosure are also intended to encompass the inverse of the disclosed video encoding techniques (i.e., video encoding techniques associated with the disclosed video decoding techniques), and vice versa.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

The embodiments may further be described using the following clauses:

1. A computer-implemented method for decoding video, comprising:
  determining a filter based on neighboring samples of intra predicted samples of a picture;
  generating an offset value from the neighboring samples;
  refining the intra predicted sample by adding that offset value; and
  applying the filter to the intra predicted samples.
2. The method according to clause 1, wherein the intra predicted samples comprise a sub-block of an intra predicted block, and determining of the filter based on the neighboring samples of the intra predicted samples further comprises:

determining the filter based on top and left neighboring samples of the sub-block.
3. The method according to any one of clauses 1 and 2, further comprising:
in response to a mean absolute gradient of the neighboring samples being larger than a preset threshold, enabling the filter at a sub-block level.
4. The method according to any one of clauses 1 and 2, further comprising:
in response to a mean absolute gradient of the neighboring samples being equal to or less than a preset threshold, disabling the filter at a sub-block level.
5. The method according to clause 2, wherein the filter is a first filter and the intra predicted block includes a plurality of pixels, and the method further comprises:
applying a second filter to the neighboring samples before the first filter is applied, wherein the second filter is a smoothing filter.
6. The method according to clause 5, wherein applying the second filter to the neighboring samples further comprises:
determining whether a nominal directional mode is associated with an intra prediction mode of the sub-block; and
in response to the nominal directional mode being associated with the intra prediction mode of the sub-block, applying the smoothing filter to the neighboring samples.
7. The method according to clause 5, further comprising:
determining a size of the intra predicted block;
in response to the size of the intra predicted block being greater than a pre-defined threshold; and
applying the smoothing filter to the neighboring samples.
8. The method according to clause 2, wherein the sub-block has a size of M×N and the method further comprising:
applying the filter to M of the top neighboring samples, N of the left neighboring samples, a top-left neighboring sample, and one of the intra-predicted samples.
9. The method according to clause 8, wherein the M and N are integers of 4 or 8.
10. The method according to clause 2, further comprising:
determining an intra prediction mode for the intra predicted block; and
in response to the intra prediction mode being a DC mode or a smooth mode, applying, at a sub-block level, the filter for top or left neighboring samples of the sub-block.
11. The method according to clause 10, further comprising:
determining, in the DC mode, whether a luma component is included in the picture; and
in response to a determination that the luma component is included in the picture, enabling the filter at the sub-block level.
12. The method according to clause 10, further comprising:
determining, in the DC mode, whether a chroma component is included in the picture; and
in response to a determination that the chroma component is included in the picture, disabling the filter at the sub-block level.
13. The method according to clause 10, further comprising:
in response to the smooth mode being a smooth vertical mode, applying the filter to the left neighboring samples of the sub-block; and
in response to the smooth mode being a smooth horizontal mode, applying the filter to the top neighboring samples of the sub-block.
14. The method according to clause 10, further comprising:
signaling a flag of a bitstream, from an encoder side, indicating that the filter is enabled or disabled at the sub-block level.
15. The method according to clause 14, wherein the flag is signaled at the sub-block level in the DC mode or the smooth mode.
16. The method according to clause 14, wherein the flag is not signaled at the sub-block level in a palette mode.
17. The method according to clause 14, further comprising:
determining whether the flag of the bitstream satisfies a given condition; and
in response to a determination that the flag satisfies the given condition, enabling or disabling the filter at the sub-block level.
18. The method according to clause 17, wherein the given condition comprises the flag having a value equal to one or zero, further comprising:
determining the value of the flag; and
in response to the determination that the flag is equal to one or zero, enabling or disabling the filter at the sub-block level.
19. The method according to clause 2, further comprising:
signaling an angle delta indicating that the filter is enabled or disabled at a sub-block level.
20. The method according to clause 19, wherein the angle delta has an integer value between −3 to 4; the method further comprising:
in response to the integer value being 4, applying the filter at the sub-block level.
21. A non-transitory computer readable medium storing a bitstream, wherein the bitstream comprises:
a flag indicating whether a filter is enabled at a sub-block level of generated intra predicted samples,
wherein the generated intra predicted samples comprise a sub-block of an intra predicted block, and
wherein the filter:
is determined based on top and left neighboring samples of the sub-block; and
is applied to the top or left neighboring samples of the sub-block in response to a determination of an intra prediction mode for the intra predicted block.
22. A system for a process for decoding video, the system comprising:
a memory storing a set of instructions; and
one or more processors configured to execute the set of instructions to cause the system to perform:
determining a filter based on neighboring samples of intra predicted samples of a picture; generating an offset value based on the neighboring samples;
refining the intra predicted samples by adding the offset value; and
applying the filter to the intra predicted samples.
23. The system according to clause 22, wherein the intra predicted samples comprise a sub-block of an intra predicted block, and the determining of the filter based on the neighboring samples of the intra predicted samples further comprises:
determining the filter based on top and left neighboring samples of the sub-block.

24. The system according to any one of clauses 22 and 23, wherein the one or more processors are further configured to execute the set of instruction to cause the system to perform:
in response to a mean absolute gradient of the neighboring samples being larger than a preset threshold, enabling the filter at a sub-block level.

25. The system according to any one of clauses 22-24, wherein the one or more processors are further configured to execute the set of instruction to cause the system to perform:
in response to the mean absolute gradient of the neighboring samples being equal to or less than a preset threshold, disabling the filter at a sub-block level.

26. The system according to clause 23, wherein the filter is a first filter and the intra predicted block includes a plurality of pixels, wherein the one or more processors are further configured to execute the set of instruction to cause the system to perform:
applying a second filter to the neighboring samples before the first filter is applied, wherein the second filter is a smoothing filter.

27. The system according to clause 26, wherein applying the second filter to the neighboring samples further comprises:
determining whether a nominal directional mode is associated with an intra prediction mode of the sub-block; and
in response to the nominal directional mode being associated with the intra prediction mode of the sub-block, applying the smoothing filter to the neighboring samples.

28. The system according to clause 26, wherein the one or more processors are further configured to execute the set of instruction to cause the system to perform:
determining a size of the intra predicted block;
in response to the size of the intra predicted block being greater than a pre-defined threshold; and
applying the smoothing filter to the neighboring samples.

29. The system according to clause 23, wherein the sub-block has a size of M×N, wherein the one or more processors are further configured to execute the set of instruction to cause the system to perform:
applying the filter to M of the top neighboring samples, N of the left neighboring samples, a top-left neighboring sample, and one of the intra-predicted samples.

30. The system according to clause 29, wherein the M and N are integers of 4 or 8.

31. The system according to clause 23, wherein the one or more processors are further configured to execute the set of instruction to cause the system to perform:
determining an intra prediction mode for the intra predicted block; and
in response to the intra prediction mode being a DC mode or a smooth mode, applying, at a sub-block level, the filter for top or left neighboring samples of the sub-block.

32. The system according to clause 31, wherein the one or more processors are further configured to execute the set of instruction to cause the system to perform:
determining, in the DC mode, whether a luma component is included in the picture; and
in response to a determination that the luma component is included in the picture, enabling the filter at the sub-block level.

33. The system according to clause 31, wherein the one or more processors are further configured to execute the set of instruction to cause the system to perform:
in response to the smooth mode being a smooth vertical mode, applying the filter to the left neighboring samples of the sub-block; and
in response to the smooth mode being a smooth horizontal mode, applying the filter to the top neighboring samples of the sub-block.

34. The system according to clause 31, wherein the one or more processors are further configured to execute the set of instruction to cause the system to perform:
signaling a flag of a bitstream, from an encoder side, indicating that the filter is enabled or disabled at the sub-block level.

35. The system according to clause 34, wherein the flag is signaled at the sub-block level in the DC mode or the smooth mode.

36. The system according to clause 34, wherein the flag is not signaled at the sub-block level in a palette mode.

37. The system according to clause 34, wherein the one or more processors are further configured to execute the set of instruction to cause the system to perform:
determining whether the flag of the bitstream satisfies a given condition; and
in response to a determination that the flag satisfies the given condition, enabling or disabling the filter at the sub-block level.

38. The system according to clause 37, wherein the given condition comprises the flag having a value equal to one or zero, wherein the one or more processors are further configured to execute the set of instruction to cause the system to perform:
determining the value of the flag; and
in response to the determination that the flag is equal to one or zero, enabling or disabling the filter at the sub-block level.

39. The system according to clause 23, wherein the one or more processors are further configured to execute the set of instruction to cause the system to perform:
signaling an angle delta indicating that the filter is enabled or disabled at the sub-block level.

40. The system according to clause 39, wherein the angle delta having an integer value between −3 to 4, wherein the one or more processors are further configured to execute the set of instruction to cause the system to perform:
in response to the integer value is 4, applying the filter at the sub-block level.

41. A non-transitory computer readable medium that stores a set of instructions that is executable by one or more processors of an apparatus to cause the apparatus perform a method for decoding video comprising:
determining a filter based on neighboring samples of intra predicted samples of a picture; generating an offset value based on the neighboring samples;
refining the intra predicted samples by adding the offset value; and
applying the filter to the intra predicted samples.

42. The non-transitory computer readable medium according to clause 41, wherein the intra predicted samples comprise a sub-block of an intra predicted block, and the determining of the filter based on the neighboring samples of the intra predicted samples further comprises:
determining the filter based on top and left neighboring samples of the sub-block.

43. The non-transitory computer readable medium according to any one of clauses 41 and 42, wherein the set of instructions that is executable by one or more processors of the apparatus to cause the apparatus to further perform:
  in response to a mean absolute gradient of the neighboring samples being larger than a preset threshold, enabling the filter at sub-block level.
44. The non-transitory computer readable medium according to clause 42, wherein the filter is a first filter and the intra predicted block includes a plurality of pixels, wherein the set of instructions that is executable by one or more processors of the apparatus to cause the apparatus to further perform:
  applying a second filter to the neighboring samples before the first filter is applied, wherein the second filter is a smoothing filter.
45. The non-transitory computer readable medium according to clause 44, wherein applying the second filter to the neighboring samples further comprise:
  determining whether a nominal directional mode is associated with an intra prediction mode of the sub-block; and
  in response to the nominal directional mode being associated with the intra prediction mode of the sub-block, applying the smoothing filter to the neighboring samples.
46. The non-transitory computer readable medium according to clause 44, wherein the set of instructions that is executable by the one or more processors of the apparatus to cause the apparatus to further perform:
  determining a size of the intra predicted block;
  in response to the size of the intra predicted block being greater than a pre-defined threshold; and
  applying the smoothing filter to the neighboring samples.
47. The non-transitory computer readable medium according to clause 42, wherein the sub-block has a size of M×N, wherein the set of instructions that is executable by the one or more processors of the apparatus to cause the apparatus to further perform: applying the filter to M of the top neighboring samples, N of the left neighboring samples, a top-left neighboring sample, and one of the intra-predicted samples.
48. The non-transitory computer readable medium according to clause 47, wherein the M and N are integers of 4 or 8.
49. The non-transitory computer readable medium according to clause 42, wherein the set of instructions that is executable by the one or more processors of the apparatus to cause the apparatus to further perform:
  determining an intra prediction mode for the intra predicted block; and
  in response to the intra prediction mode being a DC mode or a smooth mode, applying, at a sub-block level, the filter for top or left neighboring samples of the sub-block.
50. The non-transitory computer readable medium according to clause 49, wherein the set of instructions that is executable by the one or more processors of the apparatus to cause the apparatus to further perform:
  determining, in the DC mode, whether a luma component is included in the picture; and
  in response to a determination that the luma component is included in the picture, enabling the filter at the sub-block level.
51. The non-transitory computer readable medium according to clause 49, wherein the set of instructions that is executable by the one or more processors of the apparatus to cause the apparatus to further perform:
  determining, in the DC mode, whether a chroma component is included in the picture; and
  in response to a determination that the chroma component is included in the picture, disabling the filter at the sub-block level.
52. The non-transitory computer readable medium according to clause 49, wherein the set of instructions that is executable by the one or more processors of the apparatus to cause the apparatus to further perform:
  in response to the smooth mode being a smooth vertical mode, applying the filter to the left neighboring samples of the sub-block; and
  in response to the smooth mode being a smooth horizontal mode, applying the filter to the top neighboring samples of the sub-block.
53. The non-transitory computer readable medium according to clause 49, wherein the set of instructions that is executable by the one or more processors of the apparatus to cause the apparatus to further perform:
  signaling a flag of a bitstream, from an encoder side, indicating that the filter is enabled or disabled at the sub-block level.
54. The non-transitory computer readable medium according to clause 53, wherein the flag is signaled at the sub-block level in the DC mode or the smooth mode.
55. The non-transitory computer readable medium according to clause 53, wherein the flag is not signaled at the sub-block level in a palette mode.
56. The non-transitory computer readable medium according to clause 53, wherein the set of instructions that is executable by the one or more processors of the apparatus to cause the apparatus to further perform:
  determining whether the flag of the bitstream satisfies a given condition; and
  in response to a determination that the flag satisfies the given condition, enabling or disabling the filter at the sub-block level.
57. The non-transitory computer readable medium according to clause 56, wherein the given condition comprises the flag having a value to one or zero, wherein the set of instructions that is executable by the one or more processors of the apparatus to cause the apparatus to further perform:
  determining the value of the flag; and
  in response to the determination that the flag is equal to one or zero, enabling or disabling the filter at the sub-block level.
58. The non-transitory computer readable medium according to clause 42, wherein the set of instructions that is executable by the one or more processors of the apparatus to cause the apparatus to further perform:
  signaling an angle delta indicating that the filter is enabled or disabled at the sub-block level.
59. The non-transitory computer readable medium according to clause 58, wherein the angle delta has an integer value between −3 to 4, wherein the set of instructions that is executable by one or more processors of the apparatus to cause the apparatus to further perform:
  in response to the integer value being 4, applying the filter at the sub-block level.

60. A video processing method comprising:
generating intra predicted samples of a picture;
determining a filter based on neighboring samples of the intra predicted samples;
generating an offset value from the neighboring samples;
refining the intra predicted sample by adding that offset value; and
applying the filter to the intra predicted samples.

61. A system for video processing, the system comprising:
a memory storing a set of instructions; and
one or more processors configured to execute the set of instructions to cause the system to perform:
generating intra predicted samples of a picture;
determining a filter based on neighboring samples of the intra predicted samples;
generating an offset value from the neighboring samples;
refining the intra predicted sample by adding that offset value; and
applying the filter to the intra predicted samples.

62. A non-transitory computer readable medium that stores a set of instructions that is executable by one or more processors of an apparatus to cause the apparatus perform a method comprising:
generating intra predicted samples of a picture;
determining a filter based on neighboring samples of the intra predicted samples;
generating an offset value from the neighboring samples;
refining the intra predicted sample by adding that offset value; and
applying the filter to the intra predicted samples.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above-described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented method for processing video data, comprising:
generating an intra predicted block having a size of M×N pixels;
determining:
a vertical array of M neighboring samples on a left side of the intra predicted block,
a horizontal array of N neighboring samples above the intra predicted block, and
a top-left neighboring sample of the intra predicted block;
generating an offset value based on differences between:
an intra predicted sample associated with a first pixel of the intra predicted block, and
each of the vertical array of M neighboring samples, the horizontal array of N neighboring samples, and the top-left neighboring sample; and
applying the offset value to the intra predicted sample associated with the first pixel,
wherein the offset value is equal to a weighted sum of the differences, wherein:
the weighted sum is calculated using a plurality of weights $W_{kn}$,
k refers to a k-th sample of the intra predicted block in a raster scan order,
n refers to a n-th un-filtered neighboring sample of the k-th sample, and
the plurality of weights $W_{kn}$ has following values for 4×4 intra predicted blocks:

| k | $W_{k0}$ | $W_{k1}$ | $W_{k2}$ | $W_{k3}$ | $W_{k4}$ | $W_{k5}$ | $W_{k6}$ | $W_{k7}$ | $W_{k8}$ |
|---|---|---|---|---|---|---|---|---|---|
| 0 | 4 | 16 | 4 | 0 | 0 | 16 | 4 | 0 | 0 |
| 1 | 2 | 4 | 16 | 4 | 0 | 8 | 2 | 0 | 0 |
| 2 | 1 | 0 | 4 | 16 | 4 | 4 | 1 | 0 | 0 |
| 3 | 0 | 0 | 2 | 4 | 16 | 2 | 0 | 0 | 0 |
| 4 | 2 | 8 | 2 | 0 | 0 | 4 | 16 | 4 | 0 |
| 5 | 0 | 2 | 8 | 2 | 0 | 2 | 8 | 2 | 0 |
| 6 | 0 | 0 | 2 | 8 | 2 | 1 | 4 | 1 | 0 |
| 7 | 0 | 0 | 0 | 2 | 8 | 1 | 2 | 0 | 0 |
| 8 | 0 | 4 | 0 | 0 | 0 | 0 | 4 | 16 | 4 |
| 9 | 0 | 0 | 4 | 0 | 0 | 0 | 2 | 8 | 2 |
| 10 | 0 | 0 | 1 | 4 | 1 | 0 | 1 | 4 | 1 |
| 11 | 0 | 0 | 0 | 2 | 4 | 0 | 0 | 4 | 0 |
| 12 | 0 | 0 | 1 | 0 | 0 | 0 | 2 | 4 | 16 |
| 13 | 0 | 0 | 0 | 1 | 0 | 0 | 1 | 2 | 8 |
| 14 | 0 | 0 | 1 | 2 | 1 | 0 | 0 | 1 | 4 |
| 15 | 0 | 0 | 0 | 1 | 2 | 0 | 0 | 1 | 2. |

2. The method according to claim 1, further comprising:
selecting the first pixel from the M×N pixels, based on an intra prediction mode associated with the intra predicted block.

3. The method according to claim 2, further comprising:
in response to the intra prediction mode being a DC mode or a smooth mode, selecting the pixel from a top boundary row or a left boundary row of the M×N pixels.

4. The method according to claim 2, further comprising:
in response to the intra prediction mode being a vertical mode or a smooth vertical mode, selecting the pixel from a left boundary row of the M×N pixels.

5. The method according to claim 2, further comprising:
in response to the intra prediction mode being a horizontal mode or a smooth horizontal mode, selecting the pixel from a top boundary row of the M×N pixels.

6. The method according to claim 1, wherein the method is used for decoding a bitstream and comprises:
decoding an angle delta parameter signaled in the bitstream; and
determining whether to apply the offset value to the intra predicted sample, based on a value of the angle delta parameter.

7. The method according to claim 6, wherein a value of the angle delta parameter is equal to 4.

8. The method according to claim 1, wherein the method is used for encoding video data and comprises:
encoding, in a bitstream, an angle delta parameter indicating whether to apply the offset value to the intra predicted sample.

9. The method according to claim 8, further comprising:
setting a value of the angle delta parameter to be equal to 4.

10. An apparatus, comprising:
a memory configured to store a set of instructions; and
one or more processors configured to execute the set of instructions to cause the apparatus to perform:
generating an intra predicted block having a size of M×N pixels;
determining:
a vertical array of M neighboring samples on a left side of the intra predicted block,
a horizontal array of N neighboring samples above the intra predicted block, and
a top-left neighboring sample of the intra predicted block;
generating an offset value based on differences between:
an intra predicted sample associated with a first pixel of the intra predicted block, and
each of the vertical array of M neighboring samples, the horizontal array of N neighboring samples, and the top-left neighboring sample; and
applying the offset value to the intra predicted sample associated with the first pixel,
wherein the offset value is equal to a weighted sum of the differences, wherein:
the weighted sum is calculated using a plurality of weights $W_{kn}$,
k refers to a k-th sample of the intra predicted block in a raster scan order,
n refers to a n-th un-filtered neighboring sample of the k-th sample, and
the plurality of weights $W_{kn}$ has following values for 4×4 intra predicted blocks:

| k | $W_{k0}$ | $W_{k1}$ | $W_{k2}$ | $W_{k3}$ | $W_{k4}$ | $W_{k5}$ | $W_{k6}$ | $W_{k7}$ | $W_{k8}$ |
|---|---|---|---|---|---|---|---|---|---|
| 0 | 4 | 16 | 4 | 0 | 0 | 16 | 4 | 0 | 0 |
| 1 | 2 | 4 | 16 | 4 | 0 | 8 | 2 | 0 | 0 |
| 2 | 1 | 0 | 4 | 16 | 4 | 4 | 1 | 0 | 0 |
| 3 | 0 | 0 | 2 | 4 | 16 | 2 | 0 | 0 | 0 |
| 4 | 2 | 8 | 2 | 0 | 0 | 4 | 16 | 4 | 0 |
| 5 | 0 | 2 | 8 | 2 | 0 | 2 | 8 | 2 | 0 |
| 6 | 0 | 0 | 2 | 8 | 2 | 1 | 4 | 1 | 0 |
| 7 | 0 | 0 | 0 | 2 | 8 | 1 | 2 | 0 | 0 |
| 8 | 0 | 4 | 0 | 0 | 0 | 0 | 4 | 16 | 4 |
| 9 | 0 | 0 | 4 | 0 | 0 | 0 | 2 | 8 | 2 |
| 10 | 0 | 0 | 1 | 4 | 1 | 0 | 1 | 4 | 1 |
| 11 | 0 | 0 | 0 | 2 | 4 | 0 | 0 | 4 | 0 |
| 12 | 0 | 0 | 1 | 0 | 0 | 0 | 2 | 4 | 16 |
| 13 | 0 | 0 | 0 | 1 | 0 | 0 | 1 | 2 | 8 |
| 14 | 0 | 0 | 1 | 2 | 1 | 0 | 0 | 1 | 4 |
| 15 | 0 | 0 | 0 | 1 | 2 | 0 | 0 | 1 | 2. |

11. The apparatus according to claim 10, wherein the one or more processors are further configured to execute the set of instructions to cause the apparatus to perform:
selecting the first pixel from the M×N pixels, based on an intra prediction mode associated with the intra predicted block.

12. The apparatus according to claim 11, wherein the one or more processors are further configured to execute the set of instructions to cause the apparatus to perform:
in response to the intra prediction mode being a DC mode or a smooth mode, selecting the pixel from a top boundary row or a left boundary row of the M×N pixels;
in response to the intra prediction mode being a vertical mode or a smooth vertical mode, selecting the pixel from the left boundary row of the M×N pixels; and
in response to the intra prediction mode being a horizontal mode or a smooth horizontal mode, selecting the pixel from the top boundary row of the M×N pixels.

13. The apparatus according to claim 10, wherein the one or more processors are further configured to execute the set of instructions to cause the apparatus to perform:
decoding an angle delta parameter signaled in the bitstream; and
determining whether to apply the offset value to the intra predicted sample, based on a value of the angle delta parameter.

14. The apparatus according to claim 13, wherein a value of the angle delta parameter is equal to 4.

15. The apparatus according to claim 10, wherein the one or more processors are further configured to execute the set of instructions to cause the apparatus to perform:
encoding, in a bitstream, an angle delta parameter indicating whether to apply the offset value to the intra predicted sample.

16. The apparatus according to claim 15, wherein the one or more processors are further configured to execute the set of instructions to cause the apparatus to perform:
setting a value of the angle delta parameter to be equal to 4.

17. A non-transitory computer readable medium storing a bitstream of video data for processing according to operations comprising:
generating an intra predicted block having a size of M×N pixels;
determining:
a vertical array of M neighboring samples on a left side of the intra predicted block, a horizontal array of N neighboring samples above the intra predicted block, and a top-left neighboring sample of the intra predicted block;

generating an offset value based on differences between:
- an intra predicted sample associated with a first pixel of the intra predicted block, and
- each of the vertical array of M neighboring samples, the horizontal array of N neighboring samples, and the top-left neighboring sample; and applying the offset value to the intra predicted sample associated with the first pixel, wherein the offset value is equal to a weighted sum of the differences, wherein:
- the weighted sum is calculated using a plurality of weights $W_{kn}$,
- k refers to a k-th sample of the intra predicted block in a raster scan order,
- n refers to a n-th un-filtered neighboring sample of the k-th sample, and
- the plurality of weights $W_{kn}$ has following values for 4×4 intra predicted blocks:

| k  | $W_{k0}$ | $W_{k1}$ | $W_{k2}$ | $W_{k3}$ | $W_{k4}$ | $W_{k5}$ | $W_{k6}$ | $W_{k7}$ | $W_{k8}$ |
|----|----|----|----|----|----|----|----|----|----|
| 0  | 4  | 16 | 4  | 0  | 0  | 16 | 4  | 0  | 0  |
| 1  | 2  | 4  | 16 | 4  | 0  | 8  | 2  | 0  | 0  |
| 2  | 1  | 0  | 4  | 16 | 4  | 4  | 1  | 0  | 0  |
| 3  | 0  | 0  | 2  | 4  | 16 | 2  | 0  | 0  | 0  |
| 4  | 2  | 8  | 2  | 0  | 0  | 4  | 16 | 4  | 0  |
| 5  | 0  | 2  | 8  | 2  | 0  | 2  | 8  | 2  | 0  |
| 6  | 0  | 0  | 2  | 8  | 2  | 1  | 4  | 1  | 0  |
| 7  | 0  | 0  | 0  | 2  | 8  | 1  | 2  | 0  | 0  |
| 8  | 0  | 4  | 0  | 0  | 0  | 0  | 4  | 16 | 4  |
| 9  | 0  | 0  | 4  | 0  | 0  | 0  | 2  | 8  | 2  |
| 10 | 0  | 0  | 1  | 4  | 1  | 0  | 1  | 4  | 1  |
| 11 | 0  | 0  | 0  | 2  | 4  | 0  | 0  | 4  | 0  |
| 12 | 0  | 0  | 1  | 0  | 0  | 0  | 2  | 4  | 16 |
| 13 | 0  | 0  | 0  | 1  | 0  | 0  | 1  | 2  | 8  |
| 14 | 0  | 0  | 1  | 2  | 1  | 0  | 0  | 1  | 4  |
| 15 | 0  | 0  | 0  | 1  | 2  | 0  | 0  | 1  | 2. |

* * * * *